United States Patent
Takagi et al.

(10) Patent No.: US 7,248,283 B2
(45) Date of Patent: Jul. 24, 2007

(54) VEHICLE PERIPHERY MONITOR

(75) Inventors: Makoto Takagi, Toyota (JP); Toshiyasu Katsuno, Nagoya (JP); Kazushi Konno, Chita (JP); Toshiaki Kakinami, Nagoya (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 903 days.

(21) Appl. No.: 10/291,618

(22) Filed: Nov. 12, 2002

(65) Prior Publication Data

US 2003/0090570 A1    May 15, 2003

(30) Foreign Application Priority Data

Nov. 12, 2001   (JP)  ............... 2001-346603

(51) Int. Cl.
- H04N 7/18 (2006.01)
- H04N 5/222 (2006.01)
- G08G 1/017 (2006.01)

(52) U.S. Cl. ............ 348/118; 348/333.05; 701/28; 340/937

(58) Field of Classification Search ........ 348/188, 348/119, 148, 115, 116, 211.11, 211.13, 333.01, 348/333.05, 373, 118; 396/378, 429; 701/28; 352/132; 340/937

See application file for complete search history.

(56) References Cited

U.S. PATENT DOCUMENTS

| | | | |
|---|---|---|---|
| 5,680,123 A * | 10/1997 | Lee ............... | 348/148 |
| 6,144,296 A | 11/2000 | Ishida et al. | |
| 6,320,612 B1 * | 11/2001 | Young ............ | 348/148 |
| 6,476,731 B1 * | 11/2002 | Miki et al. ....... | 340/937 |
| 6,593,960 B1 * | 7/2003 | Sugimoto et al. .. | 348/148 |
| 6,912,001 B2 * | 6/2005 | Okamoto et al. ... | 348/148 |
| 2003/0137586 A1 * | 7/2003 | Lewellen ......... | 348/148 |
| 2004/0199320 A1 * | 10/2004 | Harada ........... | 701/69 |

FOREIGN PATENT DOCUMENTS

DE    198 16 054 A 1    10/1998

(Continued)

OTHER PUBLICATIONS

European Patent Office Communication dated Dec. 23, 2003 with attached European search report.

*Primary Examiner*—John M. Villecco
(74) *Attorney, Agent, or Firm*—Kenyon & Kenyon LLP

(57) ABSTRACT

A front camera for filming an area stretching forwards is disposed in a front portion of a vehicle. A side camera for filming an area stretching laterally and diagonally forwards is disposed in a lateral-left portion of the vehicle. An indicator display that can be visually recognized by a driver is disposed in a compartment of the vehicle. An amount of change in the direction of the vehicle, that is, a deflection angle of the vehicle is detected on the basis of a vehicle speed and a steering angle of a steering wheel, which have been detected by means of various sensors. After the indicator display has started displaying a lateral photo image filmed by the side camera, the photo image displayed by the indicator display is shifted from the lateral photo image filmed by the side camera to a front photo image filmed by the front camera if the deflection angle has reached a predetermined angle.

15 Claims, 8 Drawing Sheets

FOREIGN PATENT DOCUMENTS

| | | |
|---|---|---|
| DE | 100 37 129 A 1 | 4/2001 |
| DE | 101 09 680 A 1 | 10/2001 |
| GB | 2341028 A * | 3/2000 |
| JP | 04243639 A * | 8/1992 |
| JP | 07215130 A * | 8/1995 |
| JP | 2000-172996 A | 6/2000 |
| JP | 2000-339598 A | 12/2000 |
| JP | 2001114048 A * | 4/2001 |

* cited by examiner

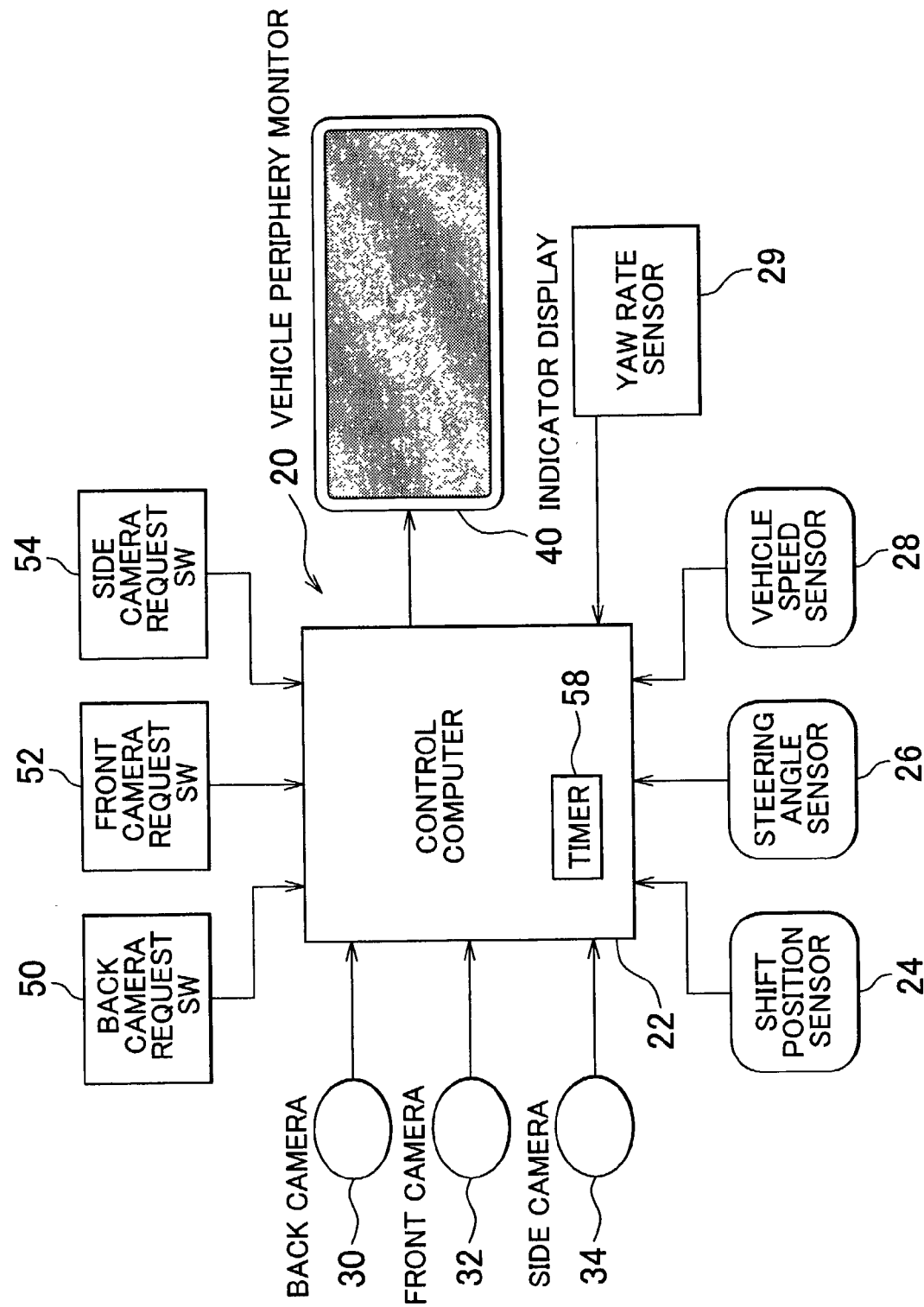

FIG. 5A
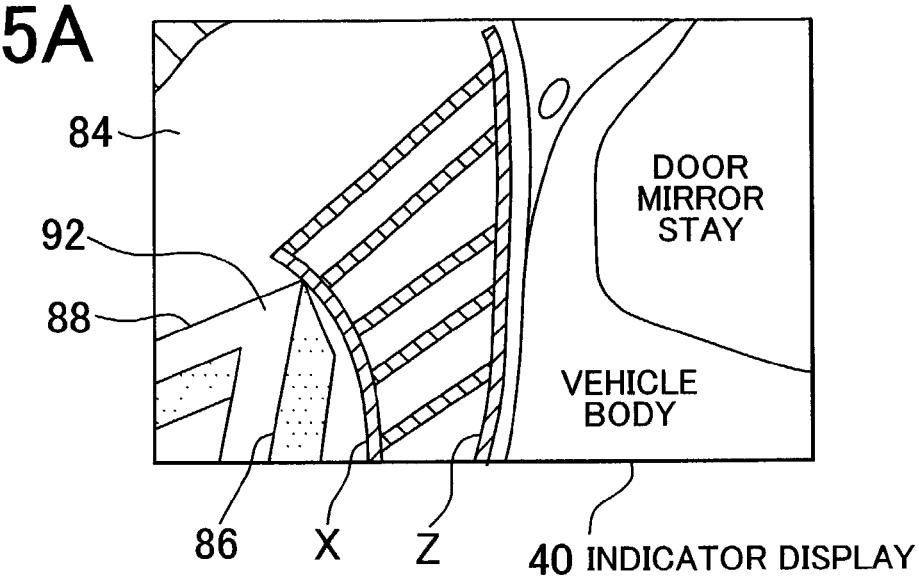
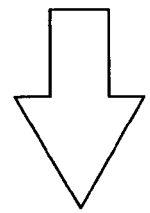
FIG. 5B
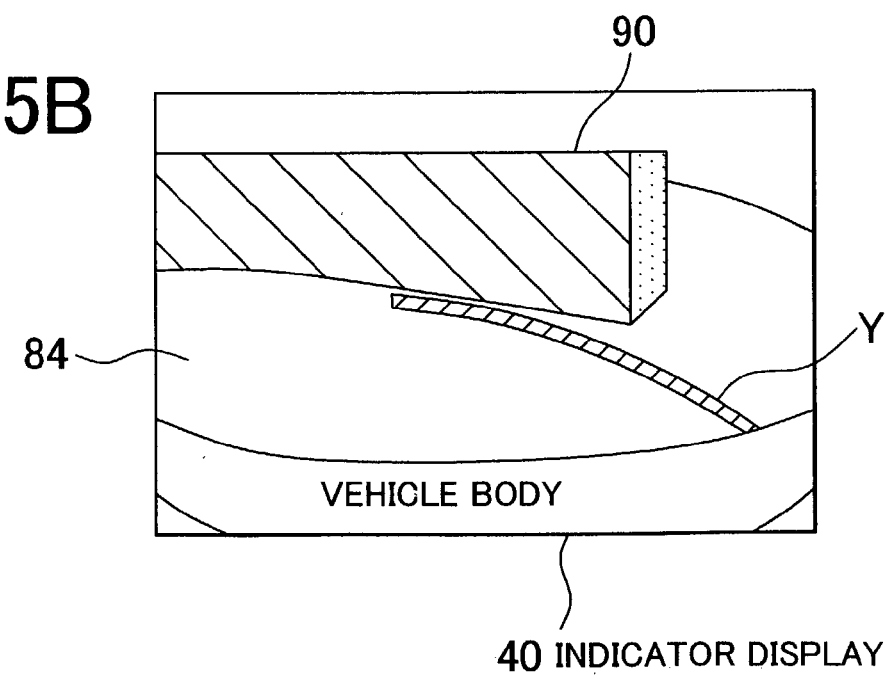

VEHICLE PERIPHERY MONITOR

INCORPORATION BY REFERENCE

The disclosure of Japanese Patent Application No. 2001-346603 filed on Nov. 12, 2001, including the specification, drawings, and abstract is incorporated herein by reference in its entirety.

BACKGROUND OF THE INVENTION

1. Field of the Invention

The invention relates to a vehicle periphery monitor for monitoring the periphery of a vehicle.

2. Description of the Related Art

In general, as disclosed in Japanese Patent Laid-Open Application No. 2000-172996, there is a vehicle periphery monitor having an indicator display for selectively or synthetically displaying a plurality of photo images representing different areas surrounding a vehicle. This monitor is provided with a plurality of cameras disposed in front and rear portions of the vehicle, and can capture a plurality of photo images representing different areas surrounding the vehicle. This monitor has a switch that can be operated by the driver.

In the aforementioned vehicle periphery monitor, if the driver selects a "pull-over-to-the-left" switch for pulling the vehicle over to the left for example, the indicator display displays a photo image representing a front-left area or a rear-left area. If the driver shifts a shift lever to an "R" range under a situation in which the "pull-over-to-the-left" switch has been selected, the indicator display displays a photo image obtained by synthesizing a front-left photo image and a rear-left photo image. Thus, in the aforementioned vehicle periphery monitor, the indicator display displays a photo image representing an area required by the driver. Hence, the driver is allowed to confirm, for example, whether or not the vehicle has approached an obstacle, by having a glance at the indicator display. As a result, the driver can be guaranteed of safe driving.

However, the photo image displayed by the indicator display of the aforementioned vehicle periphery monitor is selected through a switching operation performed by the driver. Hence, in an attempt to suitably check safety or the like by looking at the indicator display, the driver is confronted with an increase in operational burden. For example, when the vehicle enters a narrow road by making a right or left turn, it is probable that a photo image representing an area beside the vehicle be displayed by the indicator display at an initial stage of the turn so as to allow the driver to confirm whether or not there is any risk that the side of a vehicle hits, and that a photo image representing an area in front of a corner of the vehicle be displayed by the indicator display at a late stage of the turn so as to allow the driver to confirm whether or not the front portion of the vehicle has come into contact with something. In this case, the aforementioned vehicle periphery monitor requires the driver to perform a switching operation for shifting photo images while making the turn. Hence, the driver is confronted with an excessive increase in operational burden.

It is also possible that photo images representing different areas that are to be mutually shifted (i.e., the photo image representing the area beside the vehicle and the photo image representing the area in front of the corner of the vehicle in the aforementioned example) be simultaneously displayed by the indicator display. According to this method, the photo images displayed by the indicator display are small in size, and the manner in which these photo images are displayed is complicated. Hence, the driver has difficulty in instinctively recognizing a situation surrounding the vehicle. As a result, the driver is confronted with a reduction in visibility and has trouble in driving the vehicle appropriately.

SUMMARY OF THE INVENTION

It is an object of the invention to construct a vehicle periphery monitor capable of informing a driver of a situation surrounding a vehicle upon request without causing an increase in operational burden or a reduction in visibility to the driver.

A vehicle periphery monitor in accordance with a first aspect of the invention comprises a controller for causing an indicator display that can be visually recognized by a driver to selectively display a first photo image representing an area beside a vehicle (hereinafter referred to as a lateral photo image) or a second photo image representing an area different from the first photo image. The controller automatically makes a shift from one of the first and second photo images to the other upon fulfillment of a predetermined condition and causes the indicator display to display the other photo image.

In the vehicle periphery monitor in accordance with the first aspect of the invention, the second photo image may be a photo image representing an area in front of the vehicle. In the vehicle periphery monitor in accordance with the first aspect of the invention, the controller may shift the photo image displayed by the indicator display from the lateral photo image to the front photo image if it is determined that a deflection angle has reached a predetermined angle under a situation in which the indicator display displays the lateral photo image.

In the vehicle periphery monitor in accordance with the first aspect of the invention, if the deflection angle of the vehicle has reached the predetermined angle under a situation in which the indicator display displays the lateral photo image, the photo image displayed by the indicator display is shifted from the lateral photo image to the front photo image. That is, after the display of the lateral photo image at the initial stage of a turn, the front photo image is displayed if the turn has continued for a certain period. According to this construction, while the driver drives the vehicle into a narrow road by making a right or left turn for example, it is possible to inform the driver of a situation beside the vehicle at the initial stage of the turn, for example, for the purpose of allowing the driver to confirm whether or not there is any risk that the side of a vehicle hits, and to inform the driver of a situation in front of the vehicle at the late stage of the turn for the purpose of allowing the driver to confirm a gap between a lateral wall on the narrow road and the vehicle. According to the first aspect of the invention, it is possible to inform the driver of a situation surrounding the vehicle upon request and to keep the driver alert when making a turn, without causing an increase in operational burden or a reduction in visibility to the driver.

In the aforementioned first aspect, the controller may determine whether or not the deflection angle has reached the predetermined angle, on the assumption that the vehicle is in a reference state when the indicator display starts displaying the lateral photo image. This makes it possible to suitably set the timing for a shift between the lateral photo image and the front photo image as a timing when the vehicle is highly likely to come into contact with an obstacle or the like.

In the aforementioned first aspect, the controller may determine whether or not the deflection angle has reached the predetermined angle, on the basis of a yaw angle generated by the vehicle.

Furthermore, in the aforementioned first aspect of the invention, the controller may determine whether or not the deflection angle has reached the predetermined angle, on the basis of a relationship between a steering angle generated by the vehicle and a running distance. If the vehicle has covered a certain distance while maintaining a steering angle equal to or larger than a certain angle, the vehicle is deflected by a certain angle or more with respect to its initial state. Hence, in the aforementioned first aspect of the invention, the controller may determine that the deflection angle has reached the predetermined angle, if the vehicle has continuously covered a predetermined distance with the steering angle being equal to or larger than a predetermined angle.

In the aforementioned first aspect of the invention, the controller may cause the indicator display to display in a superimposed manner a predicted travel locus that is estimated to be traced by the vehicle when the indicator display displays the front photo image upon a shift from the lateral photo image.

In this case, the predicted travel locus may be an outer-wheel predicted travel locus that is estimated to be traced by outer wheels of the vehicle.

Further, the indicator display may display in a superimposed manner a predicted travel locus that is estimated to be traced by the vehicle when the indicator display displays the lateral photo image. In this case, the predicted travel locus may be an inner-wheel predicted travel locus that is estimated to be traced by inner wheels of the vehicle. Thus, if the predicted travel locus that is estimated to be traced by the vehicle is displayed in a superimposed manner when the indicator display displays the front photo image or the lateral photo image, it is possible to allow the driver to grasp a positional relationship between the vehicle and an obstacle or the like by having a glance at the indicator display, without causing an increase in operational burden to the driver.

In the aforementioned first aspect of the invention, the lateral photo image may be a photo image representing an area beside the vehicle on the other side of a driver seat. Thus, the driver can be informed of a situation beside the vehicle on the other side of the driver seat, despite the fact that the area beside the vehicle on the other side of the driver seat is less visible from the driver than the area beside the vehicle on the side of the driver seat.

Further, in the aforementioned first aspect of the invention, it is also appropriate that a first camera disposed in a front portion of the vehicle and having an optical axis oriented toward an area in front of the vehicle be provided to film the area in front of the vehicle, that a second camera disposed in a lateral portion of the vehicle and having an optical axis oriented toward an area beside the vehicle be provided to film the area beside the vehicle, and that the controller cause the indicator display to selectively display the front photo image filmed by the first camera or the lateral photo image filmed by the second camera.

A vehicle periphery monitor in accordance with a second aspect of the invention comprises a controller capable of causing an indicator display that can be visually recognized by a driver to display a first photo image (hereinafter referred to as a lateral photo image) representing an area beside the vehicle. The controller causes the indicator display to display the lateral photo image if a steering angle has reached a first angle. The controller stops the indicator display from displaying the lateral photo image if the steering angle has reached and then dropped below a second angle that is larger than the first angle.

In the second aspect of the invention, the indicator display displays the lateral photo image if the steering angle of the vehicle has reached the first angle. Hence, the driver can be provided at an early timing in advance with a photo image of an area stretching in a direction along which the vehicle travels while making a turn, without causing an increase in operational burden or a reduction in visibility to the driver. If the steering angle of the vehicle has reached and then dropped below a second angle that is larger than the first angle, the indicator display stops displaying the lateral photo image. If the steering angle has temporarily increased and then decreased, it can be determined that the vehicle makes a shift from a state of turning to a state of traveling straight ahead. The demand to monitor the area beside the vehicle falls. Accordingly, the invention makes it possible to inform the driver of a situation beside the vehicle during a turn, at an early timing and for a required period.

In this case, in the second aspect of the invention, the controller may also stop the indicator display from displaying the lateral photo image if the lateral photo image remains displayed by the indicator display for a predetermined period. Thus, it is possible to prevent the lateral photo image from being continuously displayed due to the steering angle that has not reached the second angle yet after having reached the first angle, without imposing an operational burden on the driver.

In the second aspect of the invention, it is appropriate that the controller cause the indicator display to selectively display the lateral photo image or the front photo image representing the area different from the lateral photo image, namely, the area in front of the vehicle, and that the controller cause the indicator display to display the front photo image if the indicator display has stopped displaying the lateral photo image. Thus, while the driver can be provided at an early timing in advance with a photo image of an area stretching in a direction along which the vehicle travels during a turn, the driver can be provided at an early timing in advance with a photo image of an area stretching in a direction along which the vehicle travels straight ahead at a late stage of the turn, without causing an increase in operational burden or a reduction in visibility to the driver.

A vehicle periphery monitor in accordance with a third aspect of the invention comprises a controller for causing an indicator display that can be visually recognized by a driver to selectively display a first photo image representing an area beside a vehicle (hereinafter referred to as a lateral photo image) or a front photo image representing an area different from the first photo image, namely, an area in front of the vehicle. The controller causes the indicator display to temporarily display the front photo image if a predetermined time has elapsed under a situation in which the indicator display displays the lateral photo image.

In the aforementioned third aspect of the invention, the indicator display temporarily displays the front photo image if the predetermined time has elapsed under the situation in which the indicator display displays the lateral photo image. According to this construction, the driver can be temporarily informed of a situation in front of the vehicle while being informed of a situation beside the vehicle, without causing an increase in operational burden or a reduction in visibility to the driver. Thus, by keeping the driver alert for the area in front of the vehicle as well, the driver can be prevented from focusing too much attention on the area beside the vehicle.

A vehicle periphery monitor in accordance with a fourth aspect of the invention comprises a controller capable of causing an indicator display that can be visually recognized by a driver to display a first photo image representing an area beside a vehicle (hereinafter referred to as a lateral photo image). The controller causes the indicator display to temporarily display the lateral photo image if it is determined that the vehicle has become ready to take off and that the steering angle is equal to or larger than the predetermined angle.

In the vehicle periphery monitor as the fourth aspect of the invention, the indicator display temporarily displays the lateral photo image if the vehicle has become ready to take off with the steering angle being equal to or larger than the predetermined angle. According to this construction, the driver can be informed of a situation beside the vehicle as a dead area during takeoff with a large steering angle, without causing an increase in operational burden or a reduction in visibility to the driver. Thus, by keeping the driver alert for the dead area, the driver is allowed to check the security of the area surrounding the vehicle.

A vehicle periphery monitor in accordance with a fifth aspect of the invention comprises a controller for causing an indicator display that can be visually recognized by a driver to selectively display a first photo image representing an area beside a vehicle (hereinafter referred to as a lateral photo image) or a traveling-direction photo image representing an area different from the lateral photo image, namely, an area in front of or behind the vehicle. The controller causes the indicator display to temporarily display the traveling-direction photo image and the lateral photo image in a predetermined order if it is determined that the vehicle has become ready to take off.

In the fifth aspect of the invention, if the vehicle has become ready to take off, the indicator display temporarily displays the traveling-direction photo image and the lateral photo image in a predetermined order. According to this construction, the driver can be informed of an overall situation of an area surrounding the vehicle during takeoff, without causing an increase in operational burden or a reduction in visibility to the driver. Thus, by keeping the driver alert for the dead area, the driver is allowed to check the security of the area surrounding the vehicle.

In the aforementioned fourth and fifth aspects of the invention, the controller may determine that the vehicle has become ready to take off, if a shift position of the vehicle has shifted from a non-drive position to a drive position or has shifted from one forward or backward drive position to the other forward or backward drive position.

In the aforementioned fourth and fifth aspects of the invention, the controller may determine that the vehicle has become ready to take off, if a braking operation has been performed with the vehicle being stopped.

In the first to fifth aspects of the invention, "the lateral photo image" may include a photo image representing a continuous area extending from a lateral portion to a front portion of the vehicle, in addition to the photo image representing the area beside the vehicle. Further, in the first to fifth aspects of the invention, "the steering angle of the vehicle" may be a steering angle actually formed by wheels or a steering angle actually formed by a steering wheel operated by the driver.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a system configuration view of a vehicle periphery monitor in accordance with a first embodiment of the invention.

FIG. 5A and FIG. 5B show in a time-series manner photo images displayed by the indicator display when a side camera is required under the situation shown in FIG. 3.

DETAILED DESCRIPTION OF PREFERRED EMBODIMENTS

Figure 2A:
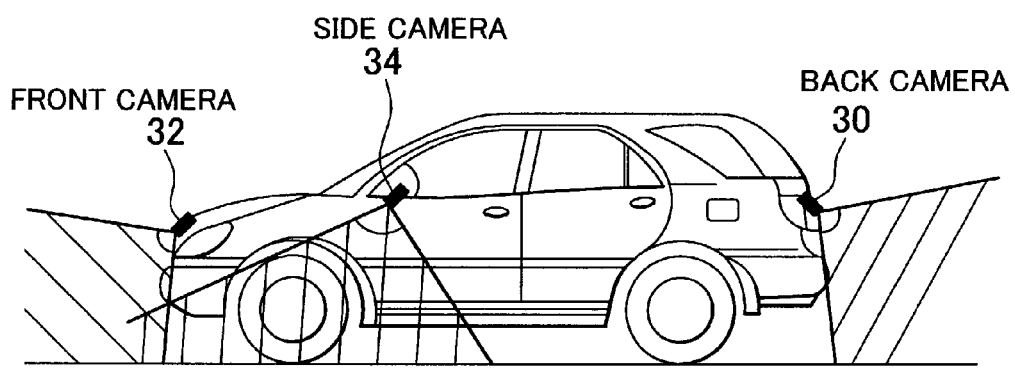
FIG. 2A and FIG. 2B show areas to be filmed by cameras of the vehicle periphery monitor in accordance with the first embodiment.

FIG. 1 shows a system configuration of a vehicle periphery monitor 20 in accordance with a first embodiment of the invention. In this embodiment, a vehicle equipped with the vehicle periphery monitor 20 has front wheels as turnable wheels that are turned in accordance with a steering operation performed by the driver and rear wheels as non-turnable wheels. The vehicle periphery monitor 20 has a monitor-purpose electronic control computer (hereinafter referred to simply as "a computer") 22. The computer 22 controls the vehicle periphery monitor 20.

A shift position sensor 24, a steering angle sensor 26, and a vehicle speed sensor 28 are connected to the computer 22. The shift position sensor 24 outputs a signal corresponding to a position of a gearshift lever operated by the driver. The steering angle sensor 26 outputs a signal corresponding to a steering angle $\delta$ of a steering wheel operated by the driver. The vehicle speed sensor 28 generates a pulse signal at intervals of a period corresponding to a vehicle speed SPD. The signals output from the shift position sensor 24, the steering angle sensor 26, and the vehicle speed sensor 28 are supplied to the computer 22.

The computer 22 detects a position of the gear-shift lever on the basis of an output signal of the shift position sensor 24, detects a steering angle $\delta$ on the basis of an output signal of the steering sensor 26, and detects a vehicle speed SPD on the basis of an output signal of the vehicle speed sensor 28. It is assumed herein that the steering angle $\delta$ is positive when the steering wheel has been turned to the left (i.e., counterclockwise) and that the steering angle $\delta$ is negative when the steering wheel has been turned to the right (i.e., clockwise).

The computer 22 determines on the basis of a position of the gear-shift lever whether or not the wheels are coupled with power (i.e., whether or not the vehicle is in a driven state) or whether or not the wheels are uncoupled with power (i.e., whether or not the vehicle is in a non-driven state). If the vehicle is in a coupled state, the computer 22 further determines whether or not the vehicle is moving forwards or whether or not the vehicle is moving backwards. The computer 22 estimates a turning radius occurring in the vehicle on the basis of the steering angle δ and the vehicle speed SPD, detects a position of the pertinent vehicle with respect to a reference position, and detects an amount of change in the direction of the vehicle (i.e., deflection angle θ). It is assumed herein that the deflection angle θ is positive when the vehicle is directed to the left (i.e., counterclockwise) from a reference direction and that the deflection angle θ is negative when the vehicle is directed to the right (i.e., clockwise) from the reference direction. The computer 22 calculates a predicted travel path (guidance route) which is estimated to be covered when the vehicle moves forwards or backwards, on the basis of a turning radius estimated on the basis of the steering angle δ.

A back camera 30 disposed at a center of a door of a vehicle rear portion, a front camera 32 disposed at a center of a grille of a vehicle front portion, and a side camera 34 disposed in a lateral portion on the other side of the driver seat of the vehicle (e.g., in a door mirror stay) are connected to the computer 22. It is also appropriate that the back camera 30 and the front camera 32 be disposed on a bumper or the like in the vehicle rear portion or the vehicle front portion. Further, it is also appropriate that the side camera 34 be disposed in a lateral portion other than the door mirror stay.

Figure 2B:
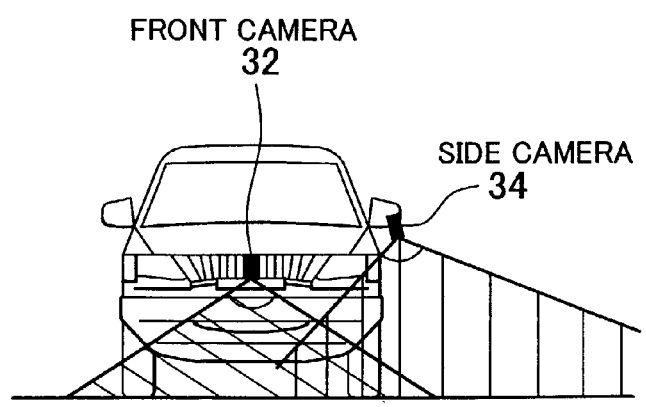

FIG. 2A and FIG. 2B show areas filmed by the cameras 30 to 34 in the first embodiment. It is to be noted herein that the areas filmed by the cameras 30 to 34 are indicated by diagonal lines in FIG. 2A and FIG. 2B. As shown in FIG. 2A and FIG. 2B, the back camera 30 has an optical axis oriented backwards from the vehicle rear portion, and films a predetermined area stretching backwards therefrom, including a dead area invisible from the driver. The front camera 32 has an optical axis oriented forwards from the vehicle front portion, and films a predetermined area stretching forwards therefrom, including a dead area invisible from the driver. The side camera 34 has an optical axis oriented sidewards and diagonally forwards from a vehicle lateral portion, and films a predetermined area stretching in that direction, including a dead area invisible from the driver. The images filmed by the cameras 30 to 34 (hereinafter referred to as a rear photo image, a front photo image, and a lateral photo image respectively) are supplied to the computer 22.

As shown in FIG. 1, an indicator display 40 is connected to the computer 22. The indicator display 40 is disposed in a console or the like in a compartment so as to ensure visibility of the driver. The computer 22 selects one of a rear photo image filmed by the back camera 30, a front photo image filmed by the front camera 32, and a lateral photo image filmed by the side camera 34 in accordance with a regulation to be described later, and drives the indicator display 40 so that the selected image is displayed by the indicator display 40.

A back camera request switch 50, a front camera request switch 52, and a side camera request switch 54 are also connected to the computer 22. Hereinafter, when generically describing the back camera request switch 50, the front camera request switch 52, and the side camera request switch 54, they will be referred to simply as the request switches 50 to 54. The request switches 50 to 54 are disposed in the console or the like in the compartment so as to be operable by the driver. For example, it is appropriate that the request switches 50 to 54 be designed to appear in a touch-panel manner on a screen of the indicator display 40.

The back camera request switch 50 is a switch that outputs a signal corresponding to whether or not the driver requests a rear photo image filmed by the back camera 30 to be displayed by the indicator display 40. The front camera request switch 52 is a switch that outputs a signal corresponding to whether or not the driver requests a front photo image filmed by the front camera 32 to be displayed by the indicator display 40. The side camera request switch 54 is a switch that outputs a signal corresponding to whether or not the driver requests a lateral photo image filmed by the side camera 34 to be displayed by the indicator display 40. The output signals of the request switches 50 to 54 are supplied to the computer 22. The computer 22 specifies an image requested by the driver to be displayed by the indicator display 40, on the basis of the output signals of the request switches 50 to 54.

A timer 58 is built into the computer 22. The timer 58 counts a time starting from a timing when a photo image on the indicator display 40 is first displayed through the request switches 50 to 54 or through fulfillment of a predetermined condition by a vehicle state as will be described later (also including a time after a shift from an image filmed by one camera to an image filmed by another camera). The computer 22 performs predetermined processings on the basis of a value counted by the timer 58, as will be described later.

Next, the operation of the vehicle periphery monitor 20 in accordance with the first embodiment will be described.

In the first embodiment, in principle, the computer 22 causes the indicator display 40 to display a photo image requested by the driver and specified on the basis of the output signals of the back camera request switch 50, the front camera request switch 52, and the side camera request switch 54. When a rear photo image is displayed by the indicator display 40, the image appears laterally inversed with respect to an image actually filmed by the back camera 30, so as to enhance visibility of the driver.

As described above, the vehicle of the first embodiment has the front wheels as turnable wheels and the rear wheels as non-turnable wheels. Hence, whether the vehicle is making a turn while moving forwards or backwards, the turn-wise inner rear wheel moves along the innermost path (with a minimum radius) and the turn-wise outer front wheel moves along the outermost path (with a maximum radius). In view of this respect, when helping the driver operate the vehicle, it is appropriate that a locus estimated to be actually traced by the turn-wise inner rear wheel moving with the minimum radius (hereinafter referred to as an inner-wheel predicted travel locus) and a locus estimated to be actually traced by the turn-wise outer front wheel moving with the maximum radius (hereinafter referred to as an outer-wheel predicted travel locus) be displayed in a superimposed manner by the indicator display 40 where photo images filmed by the cameras 30 to 34 are displayed.

Thus, in the first embodiment, the computer 22 calculates an inner-wheel predicted travel locus X and an outer-wheel predicted travel locus Y on the basis of a turning radius, conforms the inner-wheel predicted travel locus X and the outer-wheel predicted travel locus Y with photo images filmed by the cameras 30 to 34, and displays in a superimposed manner those travel loci X, Y by means of the indicator display 40 where the photo images are displayed. It is also appropriate herein that the computer 22 cause the indicator display 40 to display in a superimposed manner an elongation representative of vehicle width (hereinafter referred to as vehicle width elongation) which is determined from a positional relationship among the cameras 30 to 34 and a body of the vehicle. In this case, the inner-wheel predicted travel locus X, the outer-wheel predicted travel locus Y, and the vehicle width elongation Z are displayed by the indicator display 40 in mutually different shapes, colors, or the like.

It is to be noted herein that display of a lateral photo image filmed by the side camera 34 on the indicator display 40 is requested by operating the side camera request switch 54 mainly in the following cases where: (a) the driver confirms a situation in the periphery laterally leftward of the vehicle, for example, at the time of takeoff; (b) the driver confirms a distance to be covered when pulling the vehicle over toward a left wall; and (c) the driver confirms whether there is any risk that the side of a vehicle hits when making a left turn.

Figure 3:
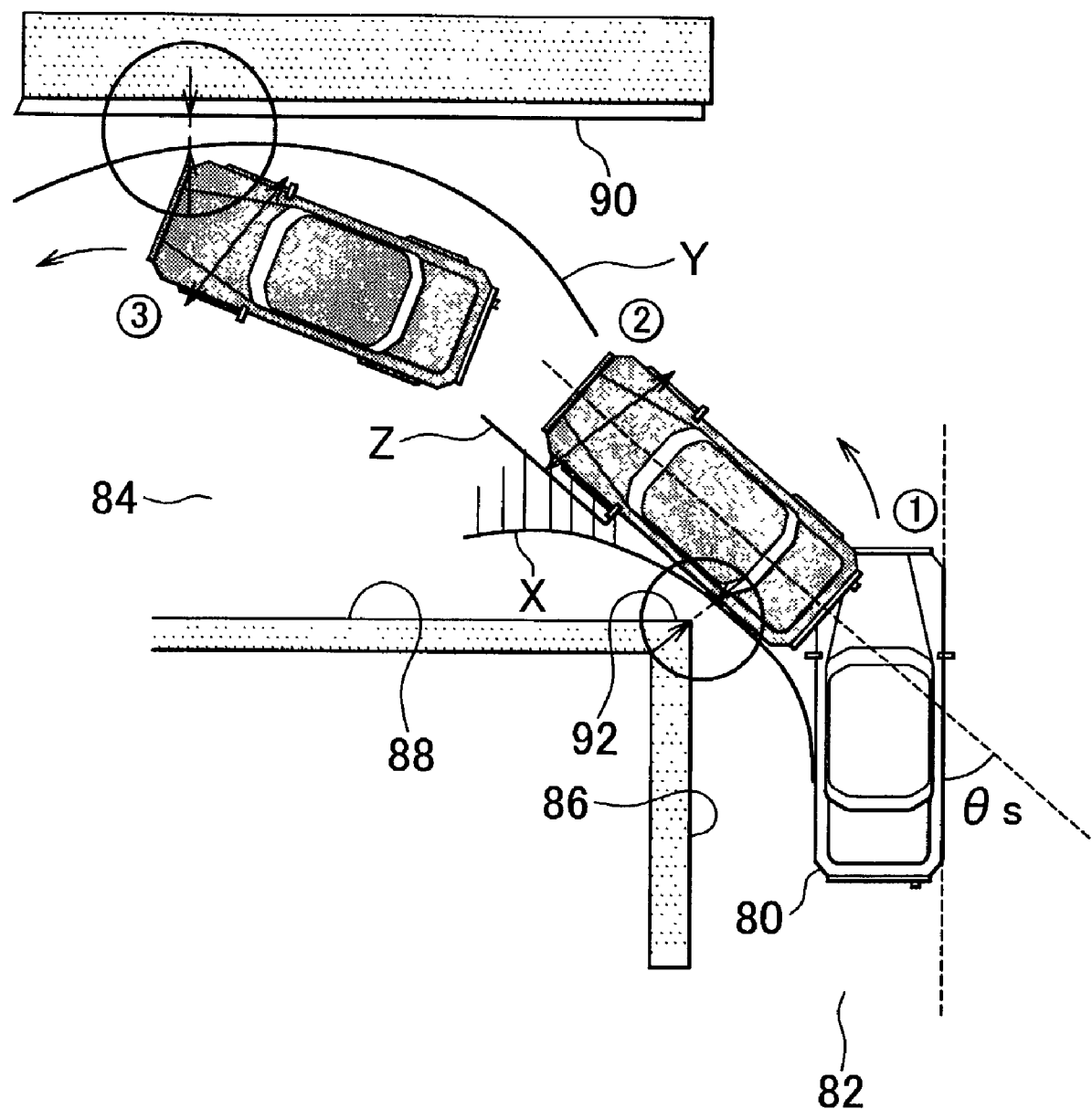
FIG. 3 schematically shows a situation in which a vehicle travels from one road into another road by making a left turn.

FIG. 3 schematically shows a situation in which a vehicle travels from a road 82 into a narrow road 84 by making a left turn. It is assumed herein that a lateral wall 86 exists beside the road 82, that lateral walls 88, 90 exist beside the road 84, and that the lateral walls 86, 88 form a corner 92. FIG. 3 also shows locations (1), (2), and (3) that are sequentially passed by the vehicle 80 when making a left turn and entering the road 84.

In order for the vehicle 80 to suitably travel from the road 82 into the road 84 by making a left turn, the driver is required to first confirm the possibility that the side of a vehicle hits due to a difference between the turn-wise inner front and rear wheels and a gap between a lateral-left portion of the vehicle 80 and the corner 92 (indicated by O in FIG. 3), and then to confirm, after duration of the turning, a gap between a front-right position of the vehicle 80 and a lateral wall 90 (indicated by O in FIG. 3). In this respect, in the aforementioned case (c), it is not appropriate that a lateral photo image that has been displayed by the indicator display 40 through operation of the side camera request switch 54 remain as it is for a long time. That is, if a lateral photo image remains displayed by the indicator display 40 despite continuation of the turning of the vehicle, the driver is unable to confirm the gap between the front-right portion of the vehicle 80 and the lateral wall 90 by having a glance at the indicator display 40. As a result, there is a risk of the front-right portion of the vehicle 80 coming into contact with the lateral wall 90.

Thus, if the vehicle continues to turn even in the case where a lateral photo image has been displayed by the indicator display 40 through operation of the side camera request switch 54, the vehicle periphery monitor 20 of the first embodiment is characterized in shifting the photo image displayed by the indicator display 40 from a lateral photo image filmed by the side camera 34 to a front photo image filmed by the front camera 32 at a suitable timing so as to confirm a gap between the front-right portion of the vehicle 80 and an obstacle such as the lateral wall 90, without requiring the driver to perform any operation. This characteristic part will be described hereinafter.

In the situation shown in FIG. 3, the driver must determine whether there is the possibility that the side of a vehicle hits on the turn-wise inner side when the vehicle 80 is located substantially parallel to the road 82 immediately before making a left turn into the road 84 (the state indicated by (1) in FIG. 3). The driver must also confirm there is a gap between the lateral-left portion of the vehicle and the corner 92 when the vehicle 80 has actually traveled from the road 82 into the road 84 (the state indicated by (2) in FIG. 3). Furthermore, the driver must confirm a gap between the front-right portion of the vehicle 80 and the lateral wall 90 when the vehicle 80 has continued to turn for a certain period (the state indicated by (3) in FIG. 3).

Accordingly, if the indicator display 40 starts displaying a lateral photo image filmed by the side camera 34 through operation of the side camera request switch 54 performed by the driver so as to determine whether the side of a vehicle hits in the aforementioned case (c), the lateral photo image remains displayed until the vehicle 80 turns to almost pass the corner 92. If the vehicle reaches such a turning state, a shift to a front photo image filmed by the front camera 32 is made. Thus, it becomes possible to permit the driver to confirm a gap formed by the lateral-left portion of the vehicle 80 and the corner 92 and to confirm a gap between the front-right portion of the vehicle 80 and an obstacle such as the lateral wall 90 at a suitable timing, without requiring the driver to perform any operation.

If a positional relationship between the vehicle 80 and the corner 92 is the same when the driver starts confirming the possibility that the side of a vehicle hits, the amount of change in direction of the vehicle 80 (i.e., deflection angle $\theta$) is substantially constant from the start of the confirmation until the vehicle 80 passes the corner 92. Thus, in shifting the photo image displayed by the indicator display 40 from a lateral photo image filmed by the side camera 34 to a front photo image filmed by the front camera 32 as described above, it is appropriate to detect a deflection angle $\theta$ of the vehicle 80 on the assumption that the vehicle is oriented in a reference direction when the display of a lateral photo image is started through operation of the side camera request switch 54, and to determine whether or not the deflection angle $\theta$ has reached a predetermined angle.

In the aforementioned cases (a) and (b) unlike the aforementioned case (c), there is no substantial change in the direction of the vehicle, that is, no increase in the deflection angle $\theta$ of the vehicle from a timing when the display of a lateral photo image is started through operation of the side camera request switch 54 to a timing when a peripheral situation of an area beside the vehicle is confirmed or when the vehicle has been pulled over. Hence, as described, if the photo image displayed by the indicator display 40 is shifted depending on whether or not the deflection angle $\theta$ of the vehicle 80 has reached a predetermined angle, for example, the photo image displayed by the indicator display 40 is prevented from being shifted when the driver confirms a peripheral situation of the area beside the vehicle, at the time of takeoff or when the driver confirms a process of pulling the vehicle over.

Figure 4:
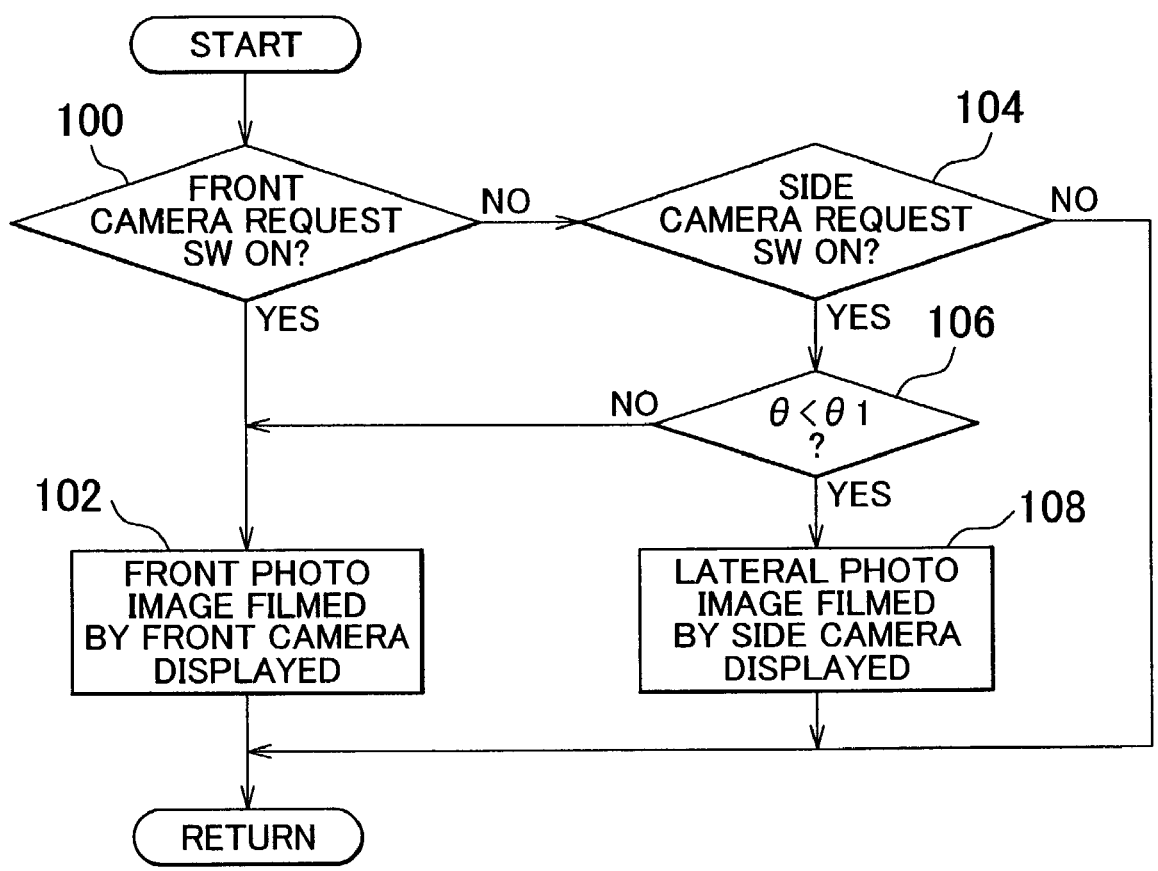
FIG. 4 is a flowchart of a control routine that is executed to shift photo images displayed by an indicator display in the first embodiment.

FIG. 4 is an exemplary flowchart of a control routine that is executed by the computer 22 in the first embodiment so as to realize the aforementioned functions. The routine shown in FIG. 4 is repeatedly started every time processings thereof are terminated. If the routine shown in FIG. 4 is started, the processing in step 100 is first performed.

In step 100, it is determined whether or not the front camera request switch 52 has been turned on, that is, whether or not the display of a front photo image filmed by the front camera 32 by means of the indicator display 40 has been requested. If the result of the determination is positive, the processing in step 102 is then performed. On the other hand, if the result of the determination is negative, the processing in step 104 is then performed.

In step 102, the processing of causing the indicator display 40 to display a front photo image filmed by the front camera 32 as to an area in front of the vehicle is performed. If the processing in step 102 is performed, the indicator display 40 thereafter displays a sight in front of the vehicle 80. If the processing in step 102 is terminated, the present routine is terminated.

In step 104, it is determined whether or not the side camera request switch 54 has been turned on, that is, whether or not the display of a lateral photo image filmed by the side camera 34 by means of the indicator display 40 has been requested. If the result of the determination is negative, the present routine is terminated without performing any further processing afterwards. On the other hand, if the result of the determination is positive, the processing in step 106 is then performed.

In step 106, it is determined whether or not the deflection angle $\theta$ of the vehicle 80, which has been detected on the basis of the steering angle $\delta$ detected by the steering angle sensor 26 and the vehicle speed SPD detected by the vehicle speed sensor 28, is smaller than a predetermined angle $\theta 1$, on the assumption that the vehicle 80 is oriented in a reference direction when the display of a lateral photo image is requested through operation of the side camera request switch 54. It is to be noted herein that the predetermined angle $\theta 1$ is a deflection angle $\theta$ of the vehicle 80 from a time when the side camera request switch 54 is operated to a time when the vehicle 80 is estimated to pass the corner 92.

If a relationship $\theta < \theta 1$ has been established, it can be determined that the vehicle 80 has not turned to the extent of passing the corner 92 after operation of the side camera request switch 54. In this case, it is appropriate that a lateral photo image filmed by the side camera 34 be displayed as requested. Accordingly, if such a determination is made, the processing in step 108 is then performed.

In step 108, the processing of causing the indicator display 40 to display a lateral photo image filmed by the side camera 34 as to a lateral area of the vehicle is performed. If the processing of this step 108 is performed, the indicator display 40 thereafter displays a sight beside the vehicle 80. If the processing of this step 108 is terminated, the present routine is terminated.

On the other hand, if the relationship $\theta < \theta 1$ has not been established in the aforementioned step 106, that is, if a relationship $\theta \geq \theta 1$ has been established, it can be determined that the vehicle 80 has passed the corner 92, and there is no need to thereafter cause the indicator display 40 to display a lateral photo image filmed by the side camera 34. In this case, it is appropriate that the photo image displayed by the indicator display 40 be thereafter shifted from the lateral photo image filmed by the side camera 34 to a front photo image filmed by the front camera 32. Accordingly, if it is determined in the aforementioned step 106 that the relationship $\theta < \theta 1$ has not been established, the processing of causing the indicator display 40 to display the front photo image filmed by the front camera 32 as to the area in front of the vehicle is performed in the aforementioned step 102.

According to the aforementioned routine shown in FIG. 4, under the situation in which the driver has requested the lateral photo image filmed by the side camera 34 to be displayed by the indicator display 40, the lateral photo image filmed by the side camera 34 can be displayed as requested until the deflection angle of the vehicle 80 reaches the predetermined angle $\theta 1$ after the request has been made, and the front photo image filmed by the front camera 32 can be displayed instead of the lateral photo image after the deflection angle $\theta$ has reached the predetermined angle $\theta 1$.

FIG. 5A and FIG. 5B show in a time-series manner photo images to be displayed by the indicator display 40 in the case where the side camera request switch 54 has been operated under the situation shown in FIG. 3 in the first embodiment. Under the situation in which the display of the lateral photo image filmed by the side camera 34 has been requested, if the photo images are displayed by the indicator display 40 as shown in FIG. 5A and FIG. 5B, it is possible to cause the driver at an early stage of a left turn of the vehicle to confirm the possibility that the side of a vehicle hits due to a difference between the turn-wise inner wheels and to confirm a gap between the lateral portion of the vehicle 80 and the corner 92. Further, it is also possible to cause the driver at a late stage of the left turn of the vehicle to confirm a gap between the front portion of the vehicle 80 and the lateral wall 90.

In the first embodiment, a shift of the photo image displayed by the indicator display 40 from the lateral photo image to the front photo image under the situation in which the display of the lateral photo image filmed by the side camera 34 has been requested is not made on the basis of an operation performed by the driver. This shift is made through a determination made on the monitor side on the basis of the deflection angle $\theta$ of the vehicle 80. Hence, the driver is prevented from facing an increase in operational burden in making such a shift of display. Further, in the first embodiment, there is no chance of the lateral photo image filmed by the side camera 34 and the front photo image filmed by the front camera 32 being displayed by the indicator display 40 simultaneously. Hence, the driver can instinctively recognize a situation surrounding the vehicle, and the driver is prevented from losing visibility.

Further, in the first embodiment, under the situation in which the driver has requested a lateral photo image filmed by the side camera 34 to be displayed by the indicator display 40, the lateral photo image filmed by the side camera 34 is displayed as requested until the deflection angle of the vehicle 80 reaches the predetermined angle $\theta 1$ after the request has been made, and a front photo image filmed by the front camera 32 is displayed instead of the lateral photo image after the deflection angle $\theta$ has reached the predetermined angle $\theta 1$. Hence, a timing for a shift between the lateral photo image and the front photo image can be suitably set as a timing when the vehicle is highly likely to come into contact with an obstacle or the like.

Thus, according to the vehicle periphery monitor, it is possible to adequately inform the driver of a peripheral situation of a portion of the vehicle 80 which tends to contact something, namely, of a peripheral situation of the vehicle which is wanted by the driver and to which attention has to be paid when the vehicle 80 makes a left turn, without causing an increase in operational burden or a reduction in visibility to the driver. Thus, according to the first embodiment, the driver can be reminded to pay attention so as to ensure safe driving when making a left turn, and it is possible for the driver to suitably and easily operate the vehicle.

If the driver has operated the side camera request switch 54 not to confirm the possibility that the side of a vehicle hits during a left turn of the vehicle 80 but to confirm a peripheral situation during takeoff or a process of pulling the vehicle over to the left, the deflection angle $\theta$ of the vehicle 80 does not substantially change from a time when the display of the lateral photo image by means of the indicator display 40 is started to a time when confirmation of the peripheral situation is completed or when the process of pulling the vehicle over is completed. In the first embodiment, even in the case where the display of the lateral photo image has been started through operation of the side camera request switch 54, if the deflection angle $\theta$ has not reached the predetermined angle $\theta 1$, the lateral photo image remains displayed. Hence, according to the first embodiment, if the side camera request switch 54 has been operated to confirm a peripheral situation at the time of takeoff or to confirm a process of pulling the vehicle over to the left, the photo image displayed by the indicator display 40 is prevented from being unexpectedly shifted to the photo image filmed by the front camera 32.

Further, in the first embodiment, if photo images filmed by the cameras 30 to 34 are displayed by the indicator display 40, the inner-wheel predicted travel locus X, the outer-wheel predicted travel locus Y, and the vehicle width elongation of the vehicle 80 are displayed in a superimposed manner by the indicator display 40 in accordance with the photo images as described above.

More specifically, if the lateral photo image filmed by the side camera 34 is displayed by the indicator display 40 as shown in FIG. 5A, the inner-wheel predicted travel locus X and the vehicle width elongation Z of the vehicle 80 are displayed in a superimposed manner. It is also appropriate herein that an area between the inner-wheel predicted travel locus X and the vehicle width elongation Z be colored on the indicator display 40 as shown in FIG. 5A. According to this construction, if the driver has requested a lateral photo image filmed by the side camera 34 to be displayed when the vehicle 80 makes a right or left turn, it is possible for the driver to suitably grasp a mutual positional relationship between the vehicle 80 and the corner 92. Thus, according to the first embodiment, the precision in confirming the possibility that the side of a vehicle hits on the turn-wise inner side and the precision in confirming a gap between the vehicle 80 and the corner 92 can be enhanced. As a result, the vehicle can be guaranteed of safe driving when making a right or left turn.

Further, if the front photo image filmed by the front camera 32 is displayed by the indicator display 40 as shown in FIG. 5B, the outer-wheel predicted travel locus Y is displayed in a superimposed manner. This construction makes it possible for the driver to adequately grasp a mutual positional relationship between the vehicle 80 and the lateral wall 90 in the case where the driver has requested the lateral photo image filmed by the side camera 34 to be displayed when the vehicle 80 makes a right or left turn. Thus, according to the first embodiment, the precision in confirming a gap between the vehicle and the lateral wall on the turn-wise outer side can be enhanced, and the vehicle can be guaranteed of safe driving when making a right or left turn.

It is to be noted in the aforementioned embodiment that the inner-wheel predicted travel locus X and the outer-wheel predicted travel locus Y correspond to "the predicted travel locus" mentioned in the claims, that the front camera 32 corresponds to "the first camera" mentioned in the claims, and that the side camera 34 corresponds to "the second camera" mentioned in the claims. Further, the computer 22 performs the processings in step 102, step 106, and step 108 in the routine shown in FIG. 4 corresponds to "the controller" mentioned in the claims. The lateral photo image corresponds to "the first photo image" mentioned in the claims. The front photo image and the rear photo image correspond to "the second photo image" mentioned in the claims, which is obtained by filming an area other than the lateral photo image.

In the aforementioned first embodiment, the deflection angle $\theta$ of the vehicle is detected on the basis of the steering angle $\delta$ of the steering wheel and the vehicle speed SPD, and the photo image displayed by the indicator display 40 is shifted from the lateral photo image to the front photo image using the deflection angle $\theta$ as a parameter. However, the invention is not limited to this construction. That is, it is also appropriate that a yaw angle generated by the vehicle be directly detected or that a deflection angle $\theta$ be detected by integrating an output from a yaw rate sensor 29.

Further, in the aforementioned first embodiment, the deflection angle $\theta$ of the vehicle is detected on the basis of the steering angle $\delta$ of the steering wheel detected by the steering angle sensor 26 and the vehicle speed SPD detected by the vehicle speed sensor 28, and it is determined whether or not the deflection angle $\theta$ has reached the predetermined angle $\theta 1$ on the assumption that the vehicle is oriented in a reference direction when the display of a lateral photo image is started through operation of the side camera request switch 54, so as to shift the photo image displayed by the indicator display 40. It is also appropriate to additionally determine on the basis of a relationship between the steering angle $\delta$ and running distance whether or not the deflection angle $\theta$ has reached the predetermined angle $\theta 1$. If the vehicle covers a certain distance while maintaining a steering angle equal to or larger than a certain value, the vehicle is deflected by a certain angle or more with respect to an initial reference state. Hence, it is appropriate to determine that the deflection angle $\theta$ has reached the predetermined angle $\theta 1$ if the vehicle has continuously covered a predetermined distance with the steering angle $\delta$ thereof being equal to or larger than a predetermined angle. It is also possible to calculate a running distance on the basis of an output from the vehicle speed sensor.

Next, a second embodiment of the invention will be described with reference to FIG. 6 as well as FIGS. 1 and 2.

In the aforementioned first embodiment, the photo images filmed by the cameras 30 to 34 are displayed by the indicator display 40, in principle, through the operation of the request switches 50 to 54 performed by the driver. On the other hand, in the second embodiment, while the vehicle is running, photo images filmed by the cameras 30 to 34 are selectively displayed by the indicator display 40 in accordance with a running state of the vehicle, without requiring the driver to perform any operation. In the second embodiment, components identical to those of the aforementioned construction shown in FIG. 1 are denoted by the same reference numerals and will not be described again below.

If the steering angle $\delta$ is large under the situation in which the vehicle travels forwards, the turning radius of the vehicle is small. The lateral photo image filmed by the side camera 34 often covers a larger area in the traveling direction of the vehicle than the front photo image filmed by the front camera 32. If the turning radius is small, the angular difference between the turn-wise inner wheels is enlarged accordingly. In consideration of this respect, when the vehicle makes a sharp left turn while moving forwards, the peripheral situation to which the driver has to pay attention is a situation on the left of the vehicle. Thus, if the lateral photo image filmed by the side camera 34 is displayed by the indicator display 40 in response to an increase in the steering angle $\delta$ during the traveling of the vehicle, the driver can be informed of a situation to which the driver has to pay attention in the traveling direction of the vehicle. Further, if the turning of the vehicle is completed under the situation in which the lateral photo image filmed by the side camera 34 is displayed by the indicator display 40 according to the aforementioned method, the steering angle $\delta$ decreases. Hence, the peripheral situation of the vehicle to which the driver has to pay attention thereafter shifts from the situation on the left of the vehicle to a situation in front of the vehicle. Thus, if the front photo image filmed by the front camera 32 is displayed by the indicator display 40 in the case where the steering angle $\delta$ has decreased after the display of the lateral photo image filmed by the side camera 34 as described above, the driver can be informed of a situation to which the driver has to pay attention in the traveling direction of the vehicle.

Figure 6:
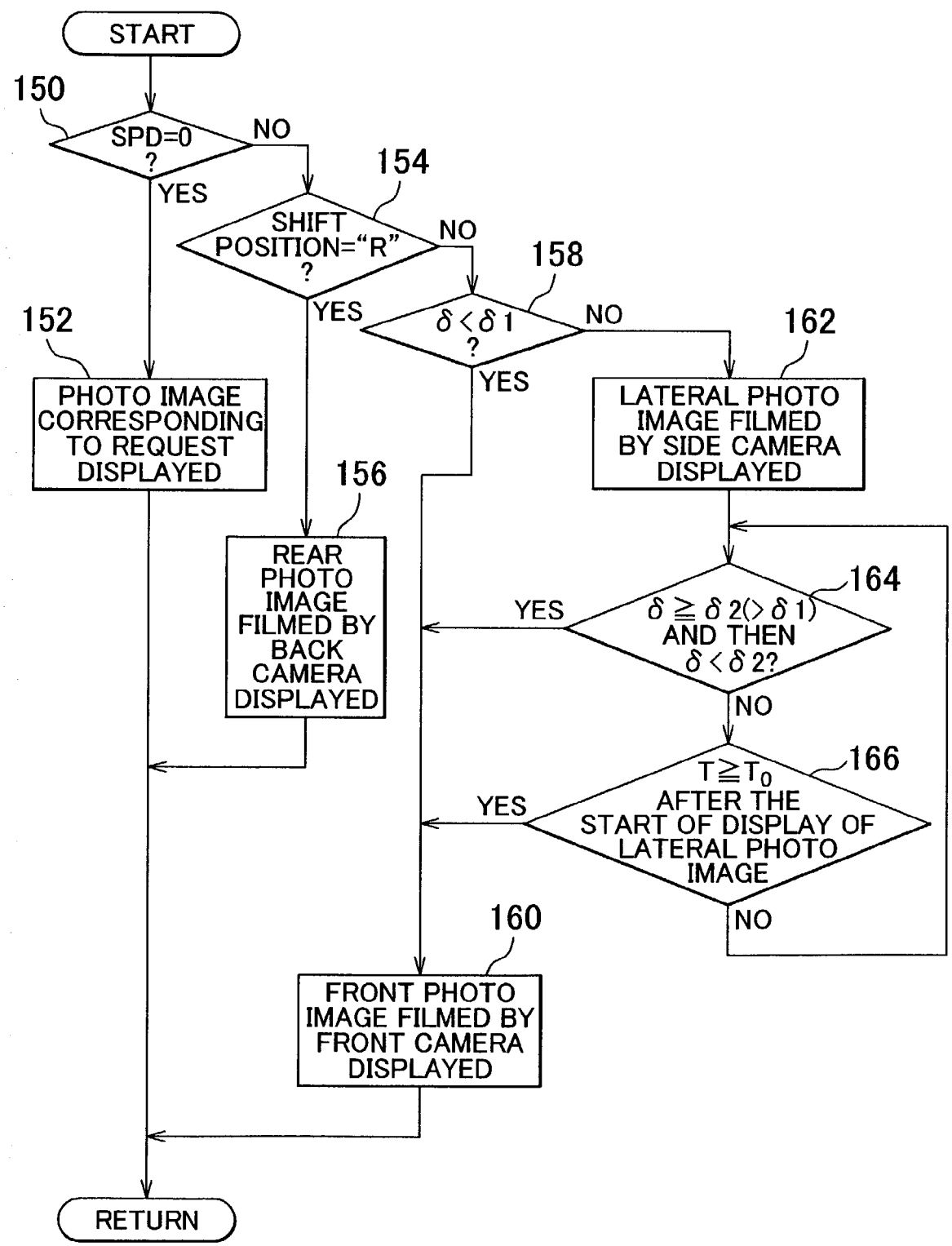
FIG. 6 is a flowchart of a control routine that is executed to shift photo images displayed by the indicator display in a second embodiment of the invention.

FIG. 6 shows an exemplary flowchart of a control routine that is executed by the computer 22 in the second embodiment so as to realize the aforementioned functions. The routine shown in FIG. 6 is repeatedly started every time processings thereof are terminated. If the routine shown in FIG. 6 is started, the processing in step 150 is first performed.

In step 150, it is determined whether or not the vehicle speed SPD detected by means of the vehicle speed sensor 28 is "0", that is, whether or not the vehicle is in a stopped state. If the vehicle is in a stopped state as a result, it is impossible to cause the indicator display 40 to display a photo image in accordance with a traveling direction of the vehicle. Thus, if the result of this determination is positive, the processing in step 152 is then performed. On the other hand, if it is determined that the vehicle is not in a stopped state, the processing in step 154 is then performed.

In step 152, the processing of causing the indicator display 40 to display photo images of the cameras 30 to 34 in accordance with operational states of the back camera request switch 50, the front camera request switch 52, and the side camera request switch 54 is performed. If the processing in step 152 is performed, the indicator display 40 thereafter displays a sight corresponding to a request. If the processing in step 152 is terminated, the present routine is terminated.

In step 154, it is determined whether or not the gear-shift lever detected by means of the shift position sensor 24 is at a reverse position "R". If the gear-shift lever is at the reverse position "R", it can be determined that the vehicle is in a state of moving backwards. The area behind the vehicle is often invisible from the driver. Hence, in this case, it is appropriate that the rear photo image filmed by the back camera 30 be displayed by the indicator display 40 regardless of the steering angle δ of the steering wheel. Thus, if the result of this determination is positive, the processing in step 156 is then performed. On the other hand, if the gear-shift position is not at the reverse position "R", the aforementioned inconvenience is not caused. Thus, if the result of this determination is negative, the processing in step 158 is then performed.

In step 156, the processing of causing the indicator display 40 to display the rear photo image filmed by the back camera 30 as to the area behind the vehicle is performed. If the processing in step 156 is performed, the indicator display 40 thereafter displays a sight behind the vehicle. If the processing in step 156 is terminated, the present routine is terminated.

In step 158, it is determined whether or not the steering angle δ of the steering wheel detected by means of the steering angle sensor 26 is smaller than a predetermined angle δ1. It is to be noted herein that the predetermined angle δ1 is a steering angle δ at a time immediately preceding a time when it can be determined that the lateral photo image filmed by the side camera 34 covers a larger area in the traveling direction of the vehicle than the front photo image filmed by the front camera 32. If it is determined that a relationship δ<δ1 has been established as a result, the processing in step 160 is then performed. On the other hand, if it is determined that the relationship δ<δ1 has not been established, the processing in step 162 is then performed.

In step 160, the processing of causing the indicator display 40 to display the front photo image filmed by the front camera 32 as to the area in front of the vehicle is performed. If the processing in step 160 is performed, the indicator display 40 thereafter displays a sight in front of the vehicle. If the processing in step 160 is terminated, the present routine is terminated. Further, in step 162, the processing of causing the indicator display 40 to display the lateral photo image filmed by the side camera 34 as to the area beside the vehicle is performed. If the processing in step 162 is performed, the indicator display 40 thereafter displays a sight beside the vehicle. If the processing in step 162 is terminated, the processing in step 164 is then performed.

In step 164, it is determined whether or not the steering angle δ has become equal to or larger than a predetermined angle δ2 that is larger than the predetermined angle δ1 after being regarded in the aforementioned step 158 as having reached the predetermined angle δ1, and has thereafter dropped below the predetermined angle δ2. The predetermined angle δ2 is a steering angle δ from which it can be determined that the lateral photo image filmed by the side camera 34 covers a larger area in the traveling direction of the vehicle than the front photo image filmed by the front camera 32. The predetermined angle δ2 is larger than the aforementioned predetermined angle δ1.

If the steering angle δ further increases and then decreases under the situation in which the lateral photo image filmed by the side camera 34 is displayed, it is possible to determine that the turning of the vehicle is about to end. Hence, the necessity to inform the driver of a situation beside the vehicle decreases, whereas the necessity to inform the driver of a situation in front of the vehicle increases. Thus, if it is determined that the aforementioned condition has been fulfilled, the processing in step 160 is then performed, and the processing of shifting the photo image displayed by the indicator display 40 from the lateral photo image filmed by the side camera 34 to the front photo image filmed by the front camera 32 is performed. On the other hand, if it is determined that the aforementioned condition has not been fulfilled, the processing in step 166 is then performed.

In step 166, it is determined whether or not a time T that has elapsed after the start of the display of the lateral photo image filmed by the side camera 34 in the aforementioned step 162 has reached a predetermined time T0. It is to be noted herein that the predetermined time T0 is set as an average time from a time when the steering angle δ of the vehicle becomes equal to or larger than the predetermined angle δ1 through a time when the steering angle δ then becomes equal to or larger than the predetermined angle δ2 to a time when the steering angle δ drops below the predetermined angle δ2. If it is determined that a relationship T≧T0 has not been established as a result, the processing in the aforementioned step 164 is repeatedly performed. On the other hand, if the relationship T≧T0 has been established, it is possible to determine that a sufficient time for displaying the lateral photo image filmed by the side camera 34 has continuously elapsed, and it is appropriate that the photo image displayed by the indicator display 40 be shifted to the front photo image filmed by the front camera 32. Thus, if the result of this determination is positive, the aforementioned processing in step 160 is then performed. The aforementioned routine shown in FIG. 6 makes it possible to cause the indicator display 40 to display the photo images corresponding to the request switches 50 to 54 while the vehicle is stopped, to cause the indicator display 40 to display the rear photo image filmed by the back camera 30 disposed at the rear portion of the vehicle body when the vehicle moves backwards, to cause the indicator display 40 to display the front photo image filmed by the front camera 32 if the steering angle of the steering wheel is small under the situation in which the vehicle moves forwards, and to cause the indicator display 40 to display the lateral photo image filmed by the side camera 34 if the steering angle of the steering wheel is large under the situation in which the vehicle moves forwards.

According to this construction, while the vehicle is traveling, the driver can be informed of a situation in front of the vehicle where the traveling direction of the vehicle can be easily recognized if the steering angle $\delta$ is small, whereas the driver can be informed of a situation beside the vehicle where the traveling direction of the vehicle can be easily recognized if the steering angle $\delta$ is large. Thus, according to the second embodiment, it is possible to suitably inform the driver, while driving, of a peripheral situation of the vehicle to which the driver has to pay attention, in accordance with a running state of the vehicle, and it is possible to keep the driver alert in driving the vehicle.

In the second embodiment, a so-called hysteresis is set as to a threshold of a parameter for shifting the photo image displayed by the indicator display 40. That is, the condition for starting the display of a lateral photo image filmed by the side camera 34 is that the steering angle $\delta$ reaches the predetermined angle $\delta 1$ which is relatively small, whereas the condition for thereafter starting the display of a front photo image filmed by the front camera 32 is that the steering angle $\delta$ drops below the predetermined angle $\delta 2$ which is relatively large.

Hence, according to the second embodiment, without causing the driver to face an increase in operational burden through reduced operability or visibility, the driver is informed of a situation beside the vehicle where the traveling direction of the vehicle can be easily recognized for a required period starting from a relatively early time at an initial stage of a turn of the vehicle, and of a situation in front of the vehicle where the traveling direction of the vehicle can be easily recognized at a relatively early time at a late stage of the turn of the vehicle. Thus, the vehicle periphery monitor 20 in accordance with the second embodiment informs the driver well in advance of a peripheral situation of the vehicle to which the driver has to pay attention, and thus makes it possible to keep the driver alert and to ensure safe driving during a turn.

Further, in the case where a hysteresis is set as to a threshold of a parameter for shifting the photo image displayed by the indicator display 40, even if the turning of the vehicle has been completed, for example, because the steering angle $\delta$ that has reached the predetermined angle $\delta 1$ does not reach the predetermined angle $\delta 2$ afterwards, the lateral photo image filmed by the side camera 34 may remain displayed. Hence, according to the second embodiment, with a view to avoiding such an inconvenience, if a predetermined time has elapsed after the start of the display of the lateral photo image filmed by the side camera 34, the lateral photo image ceases to be displayed, and the front photo image filmed by the front camera 32 is displayed. Hence, according to the second embodiment, the lateral photo image filmed by the side camera 34 is prevented from unduly remaining displayed, without requiring the driver to perform any operation.

It is to be noted in the aforementioned second embodiment that the predetermined angle $\delta 1$ corresponds to "the first angle" mentioned in the claims, that the predetermined angle $\delta 2$ corresponds to "the second angle" mentioned in the claims, that the predetermined time TO corresponds to "the predetermined time" mentioned in the claims.

In the aforementioned second embodiment, after the display of the lateral photo image filmed by the side camera 34 has been started, the lateral photo image remains displayed until the steering angle $\delta$ is reduced or until a predetermined time elapses. However, while the lateral photo image remains displayed, it is also appropriate that the photo image displayed by the indicator display 40 be temporarily shifted to the front photo image filmed by the front camera 32, for example, every time a certain period elapses or every time the vehicle covers a certain distance. According to this construction, without requiring the driver to perform any operation, the driver is temporarily informed of a situation in front of the vehicle while being informed of a situation beside the vehicle. Thus, the driver can be prevented from focusing too much attention on the area beside the vehicle, whereby it becomes possible to guarantee much safer driving while making a turn. That is, the lateral photo image can be prevented from remaining displayed, without imposing an operational burden on the driver.

Next, a third embodiment of the invention will be described with reference to FIG. 7 as well as FIGS. 1 and 2.

When starting the vehicle from a stopped state, the driver first has to confirm, just before takeoff, a situation of an area toward which the vehicle is to travel. Thus, the third embodiment is designed to help the driver check safety by causing the indicator display 40 to display a peripheral situation of the vehicle as a photo image in the case where the vehicle is ready for takeoff, without requiring the driver to perform any operation. In the third embodiment, components identical to those of the aforementioned construction shown in FIG. 1 are denoted by the same reference numerals and will not be described again below.

During takeoff of the vehicle as well, as has been described above in the second embodiment, it is appropriate, from the standpoint of informing the driver of a situation to which the driver has to pay attention in the traveling direction of the vehicle, that a front photo image filmed by the front camera 32 be displayed by the indicator display 40 if the steering angle $\delta$ is small, and that a lateral photo image filmed by the side camera 34 be displayed by the indicator display 40 if the steering angle $\delta$ is large.

Further, in the third embodiment, the vehicle has rear wheels RL, RR as non-turnable wheels and front wheels FL, FR as turnable wheels as described above. Hence, when the vehicle moves backwards by making a turn, the front portion of the vehicle on the turn-wise outer side swings outwards considerably and thus causes a substantial difference between the tracks of the turn-wise outer wheels. Thus, when the vehicle starts backwards while making a turn, it is appropriate from the standpoint of checking safety that the driver be informed of a situation beside the vehicle by causing the indicator display 40 to display a lateral photo image filmed by the side camera 34.

Figure 7:
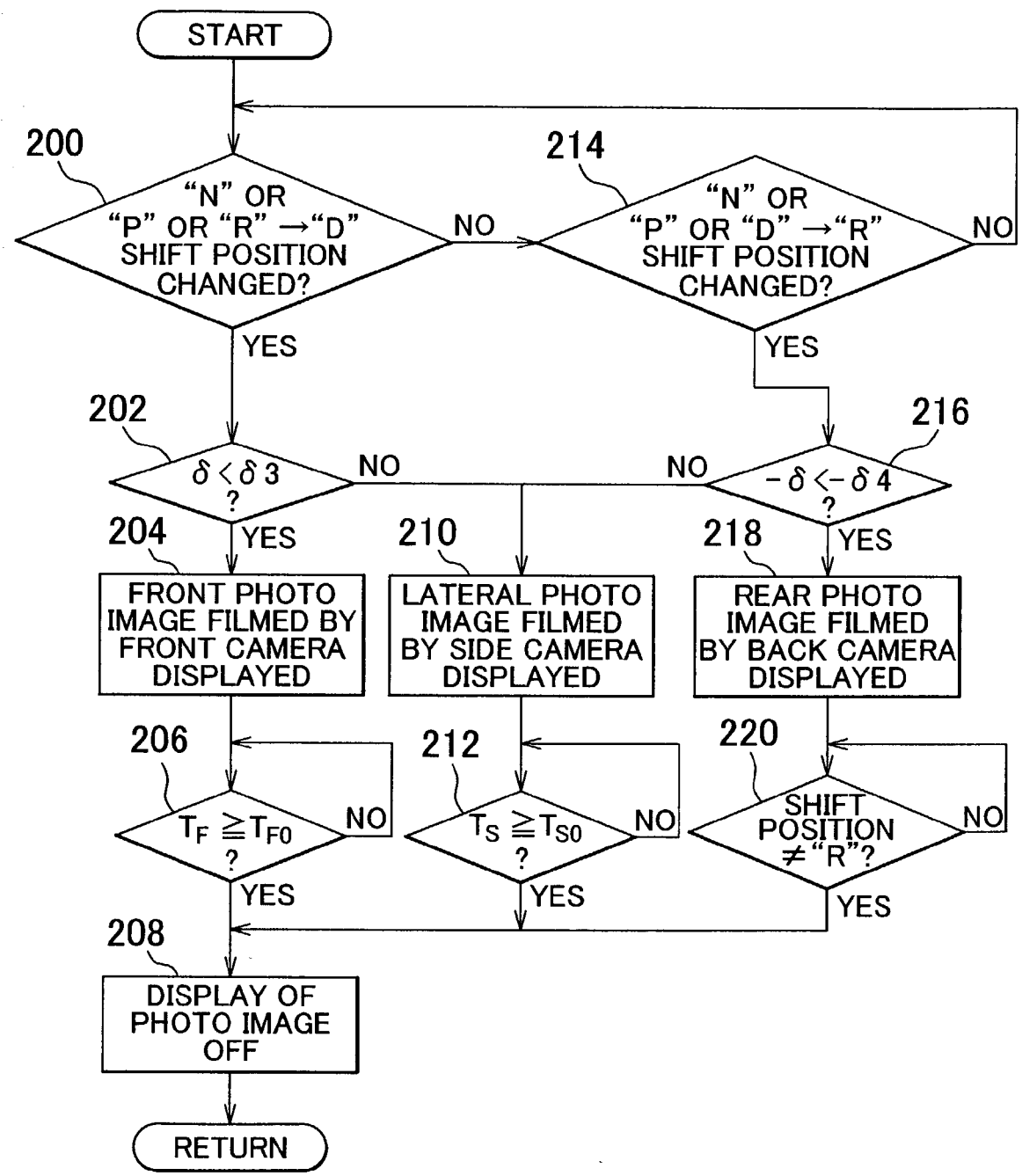
FIG. 7 is a flowchart of a control routine that is executed to shift photo images displayed by the indicator display in a third embodiment of the invention.

FIG. 7 shows an exemplary flowchart of a control routine that is executed by the computer 22 in the third embodiment so as to realize the aforementioned functions. The routine shown in FIG. 7 is repeatedly started every time processings thereof are terminated. If the routine shown in FIG. 7 is started, the processing in step 200 is first performed.

In step 200, it is determined on the basis of an output signal of the shift position sensor 24 whether or not the gear-shift lever has been shifted from a neutral position "N", a parking position "P", or the reverse position "R" to a forward position "D". If this condition has been fulfilled, it can be determined that the vehicle is allowed to move forwards. Thus, the necessity to inform the driver of a situation behind the vehicle is not vital. Accordingly, if the determination is thus made, the processing in step 202 is then performed.

In step 202, it is determined whether or not the steering angle δ of the steering wheel detected by means of the steering angle sensor 26 is smaller than a predetermined angle δ3. It is to be noted herein that the predetermined angle δ3 is a steering angle δ from which it can be determined that the lateral photo image filmed by the side camera 34 covers a larger area in the traveling direction of the vehicle than the front photo image filmed by the front camera 32. If a relationship δ<δ3 has been established as a result, it is possible to determine that the vehicle starts moving forwards almost rectilinearly. Accordingly, if the determination is thus made, the processing in step 204 is then performed.

In step 204, the processing of causing the indicator display 40 to display the front photo image filmed by the front camera 32 as to the area in front of the vehicle is performed. If the processing in step 204 is performed, the indicator display 40 thereafter displays a sight in front of the vehicle. If the processing in step 204 is terminated, the processing in step 206 is performed.

In step 206, it is determined whether or not a time TF that has elapsed after the start of the display of the front photo image filmed by the front camera 32 in the aforementioned step 204 has reached a predetermined time TFO It is to be noted herein that the predetermined time TFO is set as a time that enables the driver to broadly grasp an overall situation in front of the vehicle. If the vehicle periphery monitor is equipped with a speaker in this case, it is also appropriate that the driver be informed through audio guidance of the fact that a photo image filmed by the camera has been displayed by the indicator display 40. The processing in step 206 is repeatedly performed until it is determined that a relationship $T_F \geqq T_{F0}$ has been established. If it is determined as a result that the relationship $T_F \geqq T_{F0}$ has been established, the processing in step 208 is then performed, and the photo image displayed by the indicator display 40 ceases to be displayed. If the processing in step 208 is terminated, the present routine is terminated.

On the other hand, in the aforementioned step 202, if a relationship δ<δ3 has not been established, that is, if a relationship δ≧δ3 has been established (i.e., if the steering wheel has been considerably turned counterclockwise), it can be determined that the vehicle starts moving forwards while making a sharp left turn. In this case, it is appropriate to display a photo image filmed by the side camera 34 where the traveling direction of the vehicle can be easily recognized. Accordingly, if the determination is thus made, the processing in step 210 is then performed.

In step 210, the processing of causing the indicator display 40 to display the lateral photo image filmed by the side camera 34 as to the area beside the vehicle is performed. If the processing in step 210 is performed, a sight beside the vehicle is represented on the indicator display 40. If the processing in step 210 is terminated, the processing in step 212 is performed.

In step 212, it is determined whether or not a time $T_S$ that has elapsed after the start of the display of the lateral photo image filmed by the side camera 34 in the aforementioned step 210 has reached a predetermined time $T_{S0}$. It is to be noted herein that the predetermined time $T_{S0}$ is set as a time that enables the driver to broadly grasp an overall situation beside the vehicle. The processing in step 212 is repeatedly performed until it is determined that a relationship $T_S \geqq T_{S0}$ has been established. If it is determined as a result that the relationship $T_S \geqq T_{S0}$ has been established, the aforementioned processing in step 208 is then performed, and the photo image displayed by the indicator display 40 ceases to be displayed.

Further, if it is determined in the aforementioned step 200 that the predetermined condition has not been fulfilled, the processing in step 214 is then performed.

In step 214, it is determined on the basis of an output signal of the shift position sensor 24 whether or not the gear-shift lever has been shifted from the neutral position "N", the parking position "P", or the forward position "D" to the reverse position "R". If this condition has been fulfilled, it can be determined that the vehicle is allowed to move backwards. Therefore, the necessity to inform the driver of a situation in front of the vehicle is vital. Accordingly, if the determination is thus made, the processing in step 214 is then performed. On the other hand, if it is determined that this condition has not been fulfilled, the processing in the aforementioned step 200 is performed.

In step 216, it is determined whether or not a steering angle −δ of the steering wheel detected by means of the steering angle sensor 26 is smaller than a predetermined angle −δ4. As described above, the steering angle δ assumes a positive value if the steering wheel has been turned counterclockwise, whereas the steering angle δ assumes a negative value if the steering wheel has been turned clockwise. The predetermined angle −δ4 is a steering angle δ from which it can be determined that a difference between the turn-wise outer wheels is caused to such an extent that the front portion of the vehicle on the turn-wise outer side can be estimated to swing outwards considerably. If a relationship −δ<−δ4 has not been established as a result, that is, if a relationship −δ≧−δ4 has been established (i.e., if the steering wheel has been considerably turned clockwise), it is possible to determine that the vehicle starts moving backwards while making a sharp right turn, and it is appropriate to display a photo image filmed by the side camera 34. Thus, if it is determined that the relationship −δ<−δ4 has not been established, the aforementioned processing in step 210 is performed, and the indicator display 40 thereafter displays a sight beside the vehicle. On the other hand, if the relationship −δ<−δ4 has been established, it is possible to determine that the vehicle moves backwards almost rectilinearly. Thus, if it is determined that the relationship −δ<−δ4 has been established, the processing in step 218 is then performed.

In step 218, the processing of displaying the rear photo image filmed by the back camera 30 as to the area behind the vehicle is performed. If the processing in step 218 is performed, the indicator display 40 thereafter displays a sight behind the vehicle. If the processing in step 218 is terminated, the processing in step 220 is performed.

In step 220, it is determined on the basis of an output signal of the shift position sensor 24 whether or not the gear-shift lever has been shifted from the reverse position "R" to another position. If the gear-shift lever is maintained in the reverse position "R", there is an extensive area behind the vehicle which is invisible from the driver. Hence, it is appropriate that the rear photo image filmed by the back camera 30 remain displayed. On the other hand, if the gear-shift lever has been shifted from the reverse position "R" to another position, the necessity to display the rear photo image diminishes. Accordingly, the processing in step 220 is repeatedly performed until it is determined that the aforementioned condition has been fulfilled. If it is determined that the condition has been fulfilled, the aforementioned processing in step 208 is then performed, whereby the photo image displayed by the indicator display 40 ceases to be displayed.

According to the aforementioned routine shown in FIG. 7, under the situation in which the vehicle starts moving forwards, the front photo image filmed by the front camera 32 can be displayed by the indicator display 40 if the steering angle of the steering wheel is small, and the lateral photo image filmed by the side camera 34 can be displayed if the steering angle is large. Further, under the situation in which the vehicle starts moving backwards, the rear photo image filmed by the back camera 30 can be displayed by the indicator display 40 if the steering angle of the steering wheel is small, and the lateral photo image filmed by the side camera 34 can be displayed by the indicator display 40 if the steering angle is large.

According to this construction, without causing an increase in operational burden or a reduction in visibility to the driver, the driver can be informed of a situation in front of the vehicle where the traveling direction of the vehicle can be easily recognized if the steering angle δ is small during forward takeoff, and of a situation beside the vehicle where the traveling direction of the vehicle can be easily recognized if the steering angle δ is large during forward takeoff. Further, the driver can be informed of a situation behind the vehicle where the traveling direction of the vehicle can be easily recognized if the steering angle δ is small during backward takeoff, and of a situation beside the vehicle where the periphery of a region corresponding to a great difference between the turn-wise outer wheels is projected if the steering angle δ is large during backward takeoff.

Thus, according to the third embodiment, the driver can be adequately informed of a peripheral situation of the vehicle to which the driver has to pay attention during takeoff (a situation beside the vehicle as an invisible area in particular) in accordance with a running state of the vehicle. Thus, the vehicle periphery monitor 20 in accordance with the third embodiment makes it possible to keep the driver alert during takeoff and to cause the driver to check the safety of an area surrounding the vehicle during takeoff.

Further, according to the third embodiment, the front photo image filmed by the front camera 32 and the lateral photo image filmed by the side camera 34 cease to be displayed if the predetermined period has elapsed since the start of the display thereof. In this construction, the driver does not focus too much attention on the screen of the indicator display 40. Thus, safe driving of the vehicle based on the operation by the driver can be reliably ensured.

It is to be noted in the aforementioned third embodiment that the computer 22 performs the processings in step 200 or 214 and step 202 or 216 in the aforementioned routine shown in FIG. 7, corresponding to "the controller" mentioned in the claims.

In the aforementioned third embodiment, the front photo image filmed by the front camera 32 and the lateral photo image filmed by the side camera 34 cease to be displayed if the predetermined period has elapsed since the start of the display thereof. However, it is also appropriate that those photo images cease to be displayed not only in the case where the predetermined time has elapsed but also in the case where the vehicle has covered a predetermined distance, where the vehicle speed SPD has reached a predetermined vehicle speed, or the like. It is not absolutely required that those photo images cease to be displayed. It is also appropriate that the photo image displayed by the indicator display 40 be shifted to the front photo image filmed by the front camera 32 in the case where a predetermined time has elapsed, where the vehicle has covered a predetermined distance, or the like.

Next, a fourth embodiment of the invention will be described with reference to FIG. 8 as well as FIGS. 1 and 2.

In the aforementioned third embodiment, the photo image displayed by the indicator display 40 is changed in accordance with the steering angle δ of the steering wheel during takeoff of the vehicle. On the other hand, in the fourth embodiment, photo images filmed by the cameras 30 to 34 are displayed by the indicator display 40 in a predetermined order during takeoff of the vehicle. According to this construction, without causing an increase in operational burden or a reduction in visibility to the driver, the driver is broadly informed of a peripheral situation of the vehicle. Thus, by urging the driver to pay attention to an invisible area, the confirmation of safety in the periphery of the vehicle during takeoff thereof can be ensured. In the fourth embodiment, components identical to those of the aforementioned construction shown in FIG. 1 are denoted by the same reference numerals and will not be described again below.

Figure 8:
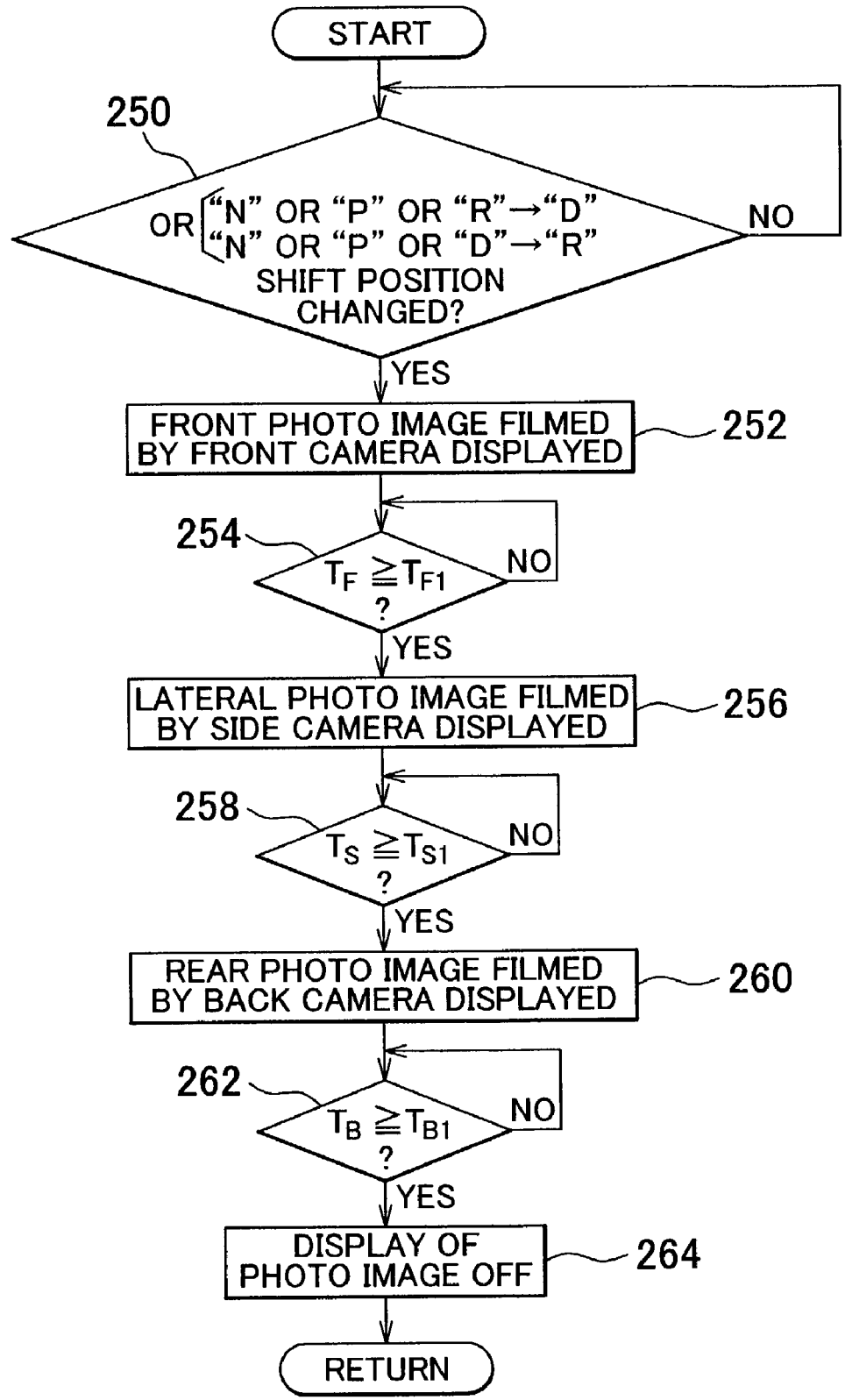
FIG. 8 is a flowchart of a control routine that is executed to shift photo images displayed by the indicator display in a fourth embodiment of the invention.

FIG. 8 shows an exemplary flowchart of a control routine that is executed by the computer 22 in the fourth embodiment so as to realize the aforementioned functions. The routine shown in FIG. 8 is repeatedly started every time processings thereof are terminated. If the routine shown in FIG. 8 is started, the processing in step 250 is first performed.

In step 250, it is determined on the basis of an output signal of the shift position sensor 24 whether or not the gear-shift lever has been shifted from the neutral position "N", the parking position "P", or the reverse position "R" to the forward position "D", or whether or not the gear-shift lever has been shifted from the neutral position "N", the parking position "P", or the forward position "D" to the reverse position "R". The processing in step 250 is repeatedly performed until it is determined that the aforementioned condition has been fulfilled. If it is determined as a result that the aforementioned condition has been fulfilled, the processing in step 252 is performed.

In step 252, the processing of displaying a front photo image filmed by the front camera 32 as to an area in front of the vehicle on the indicator display 40 is performed. If the processing in step 252 is performed, the indicator display 40 thereafter displays a sight in front of the vehicle. If the processing in step 252 is terminated, the processing in step 254 is performed.

In step 254, it is determined whether or not the time $T_F$ that has elapsed after the start of the display of the front photo image filmed by the front camera 32 in the aforementioned step 252 has reached a predetermined time $T_{F1}$. It is to be noted herein that the predetermined time $T_{F1}$ is set as a time that enables the driver to broadly grasp an overall situation in front of the vehicle. If the vehicle periphery monitor is equipped with a speaker in this case, it is also appropriate that the driver be informed through audio guidance of the fact that a photo image filmed by the camera has been displayed by the indicator display 40. The processing in step 254 is repeatedly performed until it is determined that a relationship $T_F \geq T_{F1}$ has been established. If it is determined as a result that the relationship $T_F \geq T_{F1}$ has been established, the processing in step 256 is then performed.

In step 256, the processing of causing the indicator display 40 to display a lateral photo image filmed by the side camera 34 as to an area beside the vehicle is performed. If the processing in step 256 is performed, the indicator display 40 thereafter displays a sight beside the vehicle. If the processing in step 256 is terminated, the processing in step 258 is performed.

In step 258, it is determined whether or not a time $T_{S1}$ that has elapsed after the start of the display of the lateral photo image filmed by the side camera 34 in the aforementioned step 256 has reached a predetermined time $T_{S1}$. It is to be noted herein that the predetermined time $T_{S1}$ is set as a time that enables the driver to broadly grasp an overall situation beside the vehicle. The processing in step 258 is repeatedly performed until it is determined that a relationship $T_S \geq T_{S1}$ has been established. If it is determined as a result that the relationship $T_S \geq T_{S1}$ has been established, the aforementioned processing in step 260 is then performed.

In step 260, the processing of causing the indicator display 40 to display a rear photo image filmed by the back camera 30 as to an area behind the vehicle is performed. If the processing in step 260 is performed, a sight behind the vehicle is thereafter represented on the indicator display 40. If the processing in step 260 is terminated, the processing in step 262 is performed.

In step 262, it is determined whether or not a time $T_B$ that has elapsed after the start of the display of the rear photo image filmed by the back camera 30 in the aforementioned step 260 has reached a predetermined time $T_{B1}$. It is to be noted herein that the predetermined time $T_{B1}$ is set as a time that enables the driver to broadly grasp an overall situation behind the vehicle. The processing in step 262 is repeatedly performed until it is determined that a relationship $T_B \geq T_{B1}$ has been established. If it is determined as a result that the relationship $T_B \geq T_{B1}$ has been established, the processing in step 264 is performed.

In step 264, the photo image displayed by the indicator display 40 ceases to be displayed. If the processing in step 264 is terminated, the present routine is terminated.

According to the aforementioned routine shown in FIG. 8, the front photo image filmed by the front camera 32, the lateral photo image filmed by the side camera 34, and the rear photo image filmed by the back camera 30 can be temporarily displayed in this order by the indicator display under the situation in which the vehicle takes off. According to this construction, the driver can be broadly informed of a peripheral situation of the vehicle during takeoff, without causing an increase in operational burden or a reduction in visibility to the driver. Thus, according to the vehicle periphery monitor 20 in accordance with the fourth embodiment, it is possible to cause the driver to adequately check safety in starting the vehicle.

In the fourth embodiment, after all the photo images filmed by the cameras 30 to 34 have been displayed, no more photo image is displayed by the indicator display 40. In this construction, as in the case of the aforementioned third embodiment, the driver does not focus too much attention on the screen of the indicator display 40. Thus, safe driving of the vehicle based on the operation by the driver can be reliably ensured.

It is to be noted in the aforementioned fourth embodiment that the front photo image filmed by the front camera 32 and the rear photo image filmed by the back camera 30 correspond to "the second photo image" mentioned in the claims.

In the aforementioned fourth embodiment, after all the photo images filmed by the cameras 30 to 34 have been displayed, no more photo image is displayed by the indicator display 40. However, it is also appropriate that a photo image representing a situation in the traveling direction of the vehicle be displayed by the indicator display 40.

In the aforementioned fourth embodiment, the photo image to be temporarily displayed by the indicator display 40 is shifted in the order of the front photo image filmed by the front camera 32, the lateral photo image filmed by the side camera 34, and the rear photo image filmed by the back camera 30. However, it is not absolutely required that the photo image displayed by the indicator display 40 be shifted in this order. That is, it is also appropriate that the photo image displayed by the indicator display 40 be shifted in another order. Further, it is not invariably required that the photo image displayed by the indicator display 40 be shifted in a predetermined order. The order in which those photo images are displayed may be changed in accordance with the shift position or the steering angle δ.

In the aforementioned third and fourth embodiments, it is determined whether or not the vehicle has become ready to take off, depending on whether or not the shift position has changed according to a predetermined pattern on the basis of an output signal of the shift position sensor 24. However, the invention is not limited to this construction. It is also appropriate to determine whether or not the vehicle has become ready to take off, depending on whether or not a braking operation is being performed in a stopped state of the vehicle. In this construction, if the vehicle has temporarily stopped through a braking operation after having traveled for a while, the vehicle is regarded as having become ready to take off, and the photo images filmed by the cameras 30 to 34 are displayed by the indicator display 40. Hence, it is possible to permit the driver to check safety during takeoff of the vehicle. In this case, it is also appropriate that the photo image be displayed by the indicator display 40 if a predetermined delay time has elapsed after temporary stoppage of the vehicle through a braking operation, which follows a running state of the vehicle.

According to the aforementioned first to fourth embodiments, in the arrangement wherein the back camera 30 for filming a rear area, the front camera 32 for filming a front area, and the side camera 34 for filming a lateral area are disposed in the rear, front, and lateral portions of the vehicle body respectively, the rear photo image filmed by the back camera 30 is displayed by the indicator display 40 if the driver is informed of a situation behind the vehicle, the lateral photo image filmed by the side camera 34 is displayed by the indicator display 40 if the driver is informed of a situation beside the vehicle, and the front photo image filmed by the front camera 32 is displayed by the indicator display 40 if the driver is informed of a situation in front of the vehicle. However, the invention is not limited to this construction. That is, it is also appropriate that one camera capable of filming the entire area surrounding the vehicle be disposed in the vehicle and that the photo image to be displayed by the indicator display 40 be shifted from one area to another by orienting the camera in a direction of which the driver is to be informed.

In the aforementioned first to fourth embodiments, the vehicle periphery monitor 20 is used to help the driver drive the vehicle having the rear wheels RL, RR as non-turnable wheels and the front wheels FL, FR as turnable wheels. However, the vehicle periphery monitor 20 can also be used to help the driver drive a vehicle having front wheels FL, FR as non-turnable wheels and rear wheels RL, RR as turnable wheels or a vehicle having front and rear wheels as turnable wheels.

Furthermore, in the aforementioned first to fourth embodiments, the side camera 34 is disposed only in the lateral portion on the other side of the driver seat, and the photo image filmed by the side camera 34 can be displayed by the indicator display 40. Hence, according to these embodiments, the driver can be informed of a situation beside the vehicle on the other side of the driver seat. The area beside the vehicle on the other side of the driver seat is less visible from the driver than the area beside the vehicle on the side of the driver seat. It is not absolutely required that the side camera 34 be disposed in the lateral portion on the other side of the driver seat. That is, it is also appropriate that the side camera 34 be disposed in the lateral portion on the side of the driver seat and that the indicator display 40 be capable of displaying photo images filmed by the side camera 34. In this construction, without causing an increase in operational burden or a reduction in visibility to the driver, the driver can be adequately informed of a peripheral situation of a portion of the vehicle 80 which tends to come into contact with something, namely, of a peripheral situation of the vehicle which is wanted by the driver and to which attention has to be paid, if the driver has requested a lateral photo image filmed by the side camera to be displayed for the purpose of checking safety during a right turn or if the driver has considerably turned the steering wheel to the right. As a result, it is possible to keep the driver alert in driving safely during a right turn.

In the aforementioned first to fourth embodiments, the lateral photo image may include a photo image representing a continuous area extending from the lateral portion to the front portion of the vehicle in addition to a photo image representing the lateral portion of the vehicle. Further, in the aforementioned first to fourth embodiments, the steering angle that is actually relevant to the steering wheel is regarded as the steering angle of the vehicle. However, it is also appropriate that a steering that is actually relevant to the wheels be regarded as the steering angle of the vehicle.

What is claimed is:

1. A vehicle periphery monitor comprising:
   an indicator display that can selectively display a first photo image representing an area beside a vehicle or a second photo image representing an area different from the area beside the vehicle; and
   a controller that automatically shifts the display of one of the first and second photo images on the indicator display to the other upon fulfillment of a predetermined condition,
   wherein the controller causes the indicator display to temporarily display the first photo image if it is determined that the vehicle has become ready to take off and that the steering angle is equal to or larger than a predetermined angle,
   wherein the controller determines that the vehicle has become ready to take off, if a braking operation has been performed with the vehicle being stopped.

2. The vehicle periphery monitor according to claim 1, wherein
   the second photo image is a photo image representing an area in front of the vehicle.

3. The vehicle periphery monitor according to claim 1, wherein
   the first photo image is a photo image representing an area beside the vehicle on the other side of a driver seat of the vehicle.

4. The vehicle periphery monitor according to claim 1, wherein
   the second photo image is filmed by a first camera that is disposed in a front portion of the vehicle and that has an optical axis oriented toward an area in front of the vehicle, and
   the first photo image is filmed by a second camera that is disposed in a lateral portion of the vehicle and that has an optical axis oriented toward an area beside the vehicle.

5. The vehicle periphery monitor according to claim 1, wherein
   the second photo image is a photo image representing an area in front of or behind the vehicle.

6. The vehicle periphery monitor according to claim 1, wherein
   the controller determines that the vehicle has become ready to take off, if a shift position of the vehicle has shifted from a non-drive position to a drive position or has shifted from one forward or backward drive position to the other forward or backward drive position.

7. A vehicle periphery monitor comprising:
   an indicator display; and
   a controller that causes the indicator display to temporarily display a first photo image representing an area beside a vehicle if it is determined that the vehicle has become ready to take off and that a steering angle of the vehicle is equal to or larger than a predetermined angle,
   wherein the controller determines that the vehicle has become ready to take off, if a braking operation has been performed with the vehicle being stopped.

8. The vehicle periphery monitor according to claim 7, wherein
   the controller determines that the vehicle has become ready to take off, if a shift position of the vehicle has shifted from a non-drive position to a drive position or has shifted from one forward or backward drive position to the other forward or backward drive position.

9. A method of monitoring a periphery of a vehicle having an indicator display and that selectively displays a first photo image representing an area beside the vehicle or a second photo image representing an area different from the first photo image, comprising the step of:
   automatically causing the indicator display to shift from displaying one of the first and second photo images to the other upon fulfillment of a predetermined condition,
   wherein the indicator display temporarily displays the first photo image if it is determined that the vehicle has become ready to take off and that the steering angle of the vehicle is equal to or larger than a predetermined angle,
   wherein it is determined that the vehicle has become ready to take off, if a braking operation has been performed with the vehicle being stopped.

10. The method according to claim 9, wherein
    the second photo image is a photo image representing an area in front of the vehicle.

11. The method according to claim 9, wherein:
    the second photo image is filmed by a first camera that is disposed in a front portion of the vehicle and that has an optical axis oriented toward an area in front of the vehicle, and
    the first photo image is filmed by a second camera that is disposed in a lateral portion of the vehicle and that has an optical axis oriented toward an area beside the vehicle.

12. The method according to claim 9, wherein:
    the second photo image represents one of an area in front of the vehicle and an area behind the vehicle.

13. The method according to claim 9, wherein
    it is determined that the vehicle has become ready to take off, if a shift position of the vehicle has shifted from a non-drive position to a drive position or has shifted from one forward or backward drive position to the other forward or backward drive position.

14. A method of monitoring a periphery of a vehicle having an indicator display that displays a first photo image representing an area beside the vehicle, comprising the steps of:
    determining whether or not that the vehicle has become ready to take off; and causing the indicator display to temporarily display the first photo image representing the area beside the vehicle if it is determined that a steering angle of the vehicle is equal to or larger than a predetermined angle in the event of completion of a preparation for takeoff,
wherein it is determined that the vehicle has become ready to take off, if a braking operation has been performed with the vehicle being stopped.

15. The method according to claim 14, wherein it is determined that the vehicle has become ready to take off, if a shift position of the vehicle has shifted from a non-drive position to a drive position or has shifted from one forward or backward drive position to the other forward or backward drive position.

* * * * *

UNITED STATES PATENT AND TRADEMARK OFFICE
CERTIFICATE OF CORRECTION

PATENT NO. : 7,248,283 B2 Page 1 of 1
APPLICATION NO. : 10/291618
DATED : July 24, 2007
INVENTOR(S) : Makoto Takagi et al.

It is certified that error appears in the above-identified patent and that said Letters Patent is hereby corrected as shown below:

| Column | Line | |
|---|---|---|
| 17 | 64 | Change "TO" to --T0--. |
| 19 | 20 | Change "TF" to --$T_F$--. |
| 19 | 23 | Change "TFO" to --$T_{FO}$.--. |
| 19 | 24 | Change "TFO" to --$T_{FO}$--. |

Signed and Sealed this

Thirteenth Day of May, 2008

JON W. DUDAS
*Director of the United States Patent and Trademark Office*